US011986115B2

(12) United States Patent
Walsh et al.

(10) Patent No.: US 11,986,115 B2
(45) Date of Patent: May 21, 2024

(54) SECURITY AND GUIDANCE SYSTEMS AND METHODS FOR PARCEL-RECEIVING DEVICES

(71) Applicant: Valqari Holdings, LLC, Batavia, IL (US)

(72) Inventors: Ryan Walsh, Aurora, IL (US); Stefan Prokuski, Rolling Meadows, IL (US); David Laczak, Chicago, IL (US); Alex Falesch, Naples, FL (US)

(73) Assignee: Valqari Holdings, LLC, Batavia, IL (US)

( * ) Notice: Subject to any disclaimer, the term of this patent is extended or adjusted under 35 U.S.C. 154(b) by 0 days.

(21) Appl. No.: 18/074,314

(22) Filed: Dec. 2, 2022

(65) Prior Publication Data

US 2023/0100169 A1 Mar. 30, 2023

Related U.S. Application Data

(63) Continuation of application No. PCT/US2021/036237, filed on Jun. 7, 2021.
(Continued)

(51) Int. Cl.
*A47G 29/20* (2006.01)
*A47G 29/14* (2006.01)
(Continued)

(52) U.S. Cl.
CPC ........... *A47G 29/20* (2013.01); *A47G 29/141* (2013.01); *B64U 70/90* (2023.01); *A47G 2029/142* (2013.01); *B64U 2101/64* (2023.01)

(58) Field of Classification Search
CPC .................. A47G 29/20; A47G 29/141; A47G 2029/142; B64U 70/90; B64U 2201/60;
(Continued)

(56) References Cited

U.S. PATENT DOCUMENTS 2,900,046 A 8/1959 Bailey
4,372,480 A 2/1983 Mitchell et al.
(Continued)

FOREIGN PATENT DOCUMENTS

AU 2016337362 B2 3/2021
AU 2016338690 B2 3/2021
(Continued)

OTHER PUBLICATIONS

David Gianatasio, What Every House Needs: A Century 21 Branded Landing Pad for Amazon Drones, Adweek, Dec. 6, 2013, Retrieved from the Internet: http://www.adweek.com/adfreak/century-2Is-landing-pad-will-helpyou-welcome-amazon-drone-delivery-154341.
(Continued)

*Primary Examiner* — William L Miller
(74) *Attorney, Agent, or Firm* — Cook Alex Ltd.

(57) ABSTRACT

A landing station guidance-and-security system can include an environmental cover and/or a guide-and-security bar. In some embodiments, the landing station guidance-and-security system is integrated into a parcel-receiving device. In some embodiments, the landing station guidance-and-security system is configured to attach to a parcel-receiving device. In some embodiments, the guide-and-security bar includes a precision rod. In some embodiments, a drone landing station includes: a magnetic centering mechanism configured to center a drone and/or a package; sliding dovetail doors; a plow bar; at least one roll-up door; a first storage locker; a second storage locker; and/or a solid rear door configured to block access to the second storage locker from the first storage locker when the first storage locker is being accessed by a user.

19 Claims, 16 Drawing Sheets

Related U.S. Application Data

(60) Provisional application No. 63/035,821, filed on Jun. 7, 2020.

(51) Int. Cl.
*B64U 70/90* (2023.01)
*B64U 101/64* (2023.01)

(58) Field of Classification Search
CPC ... B64U 2201/64; B64U 2101/64; B64F 1/25; B64F 1/362; B64F 1/32; B64F 1/22; B64F 1/125; G07F 5/26; G07F 5/18; G07F 7/12; G07F 17/12; B64C 25/32; B64C 39/024; G06Q 10/083; G06Q 10/0836; G06Q 10/0837; G06Q 50/32; G06Q 50/28
See application file for complete search history.

(56) References Cited

U.S. PATENT DOCUMENTS

| | | | |
|---|---|---|---|
| 4,706,407 A | 11/1987 | Melton | |
| 5,435,484 A | 7/1995 | Carlson | |
| 5,624,071 A | 4/1997 | Sosan | |
| 5,667,136 A | 9/1997 | Chen | |
| 5,774,053 A | 6/1998 | Porter | |
| 5,797,497 A | 8/1998 | Edwards | |
| 5,979,750 A | 11/1999 | Kindell | |
| 6,802,263 B1 | 10/2004 | Kolb | |
| 6,816,085 B1 | 11/2004 | Haynes et al. | |
| 6,859,005 B2 | 2/2005 | Boliver | |
| 7,023,399 B2 | 4/2006 | Zaretsky et al. | |
| 7,162,330 B2 | 1/2007 | Mayer | |
| 7,854,374 B2 | 12/2010 | Dudley | |
| 8,583,280 B1 | 11/2013 | Patel | |
| 8,915,498 B2 | 12/2014 | Hynds | |
| 9,211,025 B1 | 12/2015 | Elhawwashy | |
| 9,384,668 B2 | 7/2016 | Raptopoulos et al. | |
| 9,573,684 B2 | 2/2017 | Kimchi et al. | |
| 9,675,195 B1 | 6/2017 | De La Nuez et al. | |
| 9,704,202 B1 | 7/2017 | Delker et al. | |
| 9,840,340 B2 | 12/2017 | O'Toole | |
| 9,841,757 B2 | 12/2017 | Mikan et al. | |
| 9,959,773 B2 | 5/2018 | Raptopoulos et al. | |
| 10,023,326 B2 | 7/2018 | Byers | |
| 10,112,721 B2 | 10/2018 | Sweeny et al. | |
| 10,134,290 B2 | 11/2018 | Mikan et al. | |
| 10,293,938 B2 | 5/2019 | Thompson et al. | |
| 10,403,155 B2 | 9/2019 | Kimchi et al. | |
| 10,618,655 B2 | 4/2020 | Rinaldi et al. | |
| 10,703,494 B2 | 7/2020 | Sweeny et al. | |
| 10,720,068 B2 | 7/2020 | Raptopoulos et al. | |
| 10,919,702 B1 | 2/2021 | Berta | |
| 11,195,422 B2 | 12/2021 | Kimchi et al. | |
| 11,242,231 B1 | 2/2022 | Kashwa et al. | |
| 11,338,923 B2 | 5/2022 | Sweeny et al. | |
| 11,691,760 B2 | 7/2023 | Walsh et al. | |
| 11,713,136 B2 | 8/2023 | Foggia et al. | |
| 2001/0020619 A1 | 9/2001 | Pfeifer et al. | |
| 2002/0169628 A1 | 11/2002 | Bauer | |
| 2003/0205979 A1 | 11/2003 | Papari et al. | |
| 2004/0177567 A1 | 9/2004 | Braun | |
| 2005/0230397 A1 | 10/2005 | Yang et al. | |
| 2005/0278065 A1 | 12/2005 | Garza | |
| 2006/0113368 A1 | 6/2006 | Dudley | |
| 2007/0028506 A1 | 2/2007 | Lester | |
| 2007/0145057 A1 | 6/2007 | Nance | |
| 2007/0257036 A1 | 11/2007 | Nance | |
| 2009/0084836 A1 | 4/2009 | Dudley | |
| 2009/0194532 A1 | 8/2009 | Yang et al. | |
| 2009/0224097 A1 | 9/2009 | Kariv | |
| 2009/0240511 A1 | 9/2009 | Darrouzet | |
| 2010/0012769 A1 | 1/2010 | Alber et al. | |
| 2010/0192466 A1 | 8/2010 | McDaniel | |
| 2011/0006060 A1 | 1/2011 | Lin | |
| 2012/0080556 A1 | 4/2012 | Root | |
| 2013/0035787 A1 | 2/2013 | Canter | |
| 2013/0263618 A1 | 10/2013 | Kim | |
| 2013/0311247 A1 | 11/2013 | Wass et al. | |
| 2014/0032034 A1 | 1/2014 | Raptopoulos | |
| 2014/0098247 A1 | 4/2014 | Rao et al. | |
| 2014/0124621 A1* | 5/2014 | Godzdanker | B64F 1/125 244/110 E |
| 2015/0102903 A1 | 4/2015 | Wilkinson | |
| 2015/0120094 A1 | 4/2015 | Gur | |
| 2015/0158599 A1 | 6/2015 | Sisko | |
| 2015/0175276 A1 | 6/2015 | Koster | |
| 2015/0183528 A1 | 7/2015 | Walsh et al. | |
| 2015/0317596 A1 | 11/2015 | Hejazi | |
| 2016/0033966 A1 | 2/2016 | Farris et al. | |
| 2016/0068277 A1 | 3/2016 | Salvatore | |
| 2016/0159496 A1 | 6/2016 | O'Toole | |
| 2016/0185466 A1 | 6/2016 | Dreano, Jr. | |
| 2016/0235236 A1 | 8/2016 | Byers et al. | |
| 2016/0300187 A1 | 10/2016 | Kashi et al. | |
| 2017/0050749 A1* | 2/2017 | Pilskalns | B64D 45/08 |
| 2017/0091710 A1 | 3/2017 | Van Dyke | |
| 2017/0116568 A1 | 4/2017 | Pleis | |
| 2017/0143146 A1 | 5/2017 | Charbeneau | |
| 2017/0147975 A1 | 5/2017 | Natarajan et al. | |
| 2017/0203857 A1 | 7/2017 | O'Toole | |
| 2017/0228692 A1 | 8/2017 | Pargoe | |
| 2017/0255896 A1 | 9/2017 | Van Dyke | |
| 2017/0267348 A1 | 9/2017 | Sweeny et al. | |
| 2018/0092484 A1 | 4/2018 | Lewis et al. | |
| 2018/0105289 A1* | 4/2018 | Walsh | G06Q 50/28 |
| 2018/0170543 A1 | 6/2018 | Luckay et al. | |
| 2018/0203470 A1 | 7/2018 | Pattison et al. | |
| 2018/0225628 A1 | 8/2018 | Roy | |
| 2018/0245365 A1 | 8/2018 | Wankewycz | |
| 2018/0290764 A1* | 10/2018 | McMillian | G08G 5/0026 |
| 2018/0374034 A1 | 12/2018 | Dreano, Jr. | |
| 2019/0151947 A1 | 5/2019 | Miyashita et al. | |
| 2019/0233135 A1 | 8/2019 | Cantrell et al. | |
| 2019/0343317 A1 | 11/2019 | Cantrell et al. | |
| 2019/0383052 A1 | 12/2019 | Blake et al. | |
| 2020/0062419 A1 | 2/2020 | Hernandez et al. | |
| 2020/0094962 A1 | 3/2020 | Sweeny et al. | |
| 2020/0165008 A1 | 5/2020 | Krauss et al. | |
| 2020/0207474 A1 | 7/2020 | Foggia et al. | |
| 2020/0207485 A1 | 7/2020 | Foggia et al. | |
| 2020/0209375 A1 | 7/2020 | Foggia et al. | |
| 2020/0231393 A1* | 7/2020 | Mercado | B64F 1/368 |
| 2020/0237946 A1 | 7/2020 | Shell et al. | |
| 2020/0239161 A1* | 7/2020 | Carthew | B64U 70/00 |
| 2020/0288895 A1 | 9/2020 | Bennet et al. | |
| 2020/0349852 A1 | 11/2020 | DiCosola | |
| 2020/0401999 A1 | 12/2020 | Roy | |
| 2021/0038005 A1 | 2/2021 | Morris | |
| 2021/0045564 A1 | 2/2021 | Duckers et al. | |
| 2021/0047053 A1* | 2/2021 | Sugimoto | B64F 1/22 |
| 2021/0106160 A1 | 4/2021 | Janas | |
| 2021/0107646 A1 | 4/2021 | Sweeny et al. | |
| 2021/0124102 A1* | 4/2021 | Switzer, III | G02B 1/115 |
| 2021/0197982 A1 | 7/2021 | Sweeny et al. | |
| 2021/0224739 A1 | 7/2021 | Sweeny et al. | |
| 2021/0276735 A1* | 9/2021 | Raptopoulos | B64F 5/60 |
| 2021/0300547 A1 | 9/2021 | Stanhope et al. | |
| 2021/0321810 A1* | 10/2021 | Sun | A47G 29/30 |
| 2021/0339887 A1 | 11/2021 | Walsh et al. | |
| 2021/0371128 A1* | 12/2021 | Rodriguez | B64F 1/322 |
| 2022/0055770 A1 | 2/2022 | O'Toole | |
| 2022/0073214 A1* | 3/2022 | Liske | B64F 1/22 |
| 2022/0164760 A1 | 5/2022 | Choi et al. | |
| 2022/0246041 A1 | 8/2022 | Foggia et al. | |
| 2022/0396373 A1* | 12/2022 | Wang | B64F 1/362 |
| 2023/0058615 A1* | 2/2023 | Odinokov | B64F 1/22 |

FOREIGN PATENT DOCUMENTS

| | | |
|---|---|---|
| CA | 2898304 A1 | 1/2017 |
| CA | 3001694 A1 | 4/2017 |
| CA | 3001855 A1 | 4/2017 |
| CN | 2857710 Y | 1/2007 |

(56) References Cited

FOREIGN PATENT DOCUMENTS

| | | |
|---|---|---|
| CN | 102611200 A | 7/2012 |
| CN | 202476330 U | 10/2012 |
| CN | 202534057 U | 11/2012 |
| CN | 103115645 A | 5/2013 |
| CN | 103198425 A | 7/2013 |
| CN | 103263218 A | 8/2013 |
| CN | 103264768 A | 8/2013 |
| CN | 203132262 U | 8/2013 |
| CN | 103274047 A | 9/2013 |
| CN | 103274226 A | 9/2013 |
| CN | 203325087 U | 12/2013 |
| CN | 203350749 U | 12/2013 |
| CN | 203376795 U | 1/2014 |
| CN | 203414842 U | 1/2014 |
| CN | 106364353 A | 2/2017 |
| CN | 105484607 B | 3/2017 |
| CN | 106618124 A | 5/2017 |
| CN | 206306849 U | 7/2017 |
| CN | 105848533 B | 4/2018 |
| CN | 109891443 A | 6/2019 |
| CN | 109788861 B | 10/2020 |
| CN | 215851950 U | 2/2022 |
| CN | 109153450 B | 5/2022 |
| DE | 4435155 A1 | 4/1996 |
| DE | 202014000236 U1 | 2/2014 |
| DE | 102015209127 A1 | 11/2016 |
| EP | 2690847 A1 | 1/2014 |
| EP | 3681803 B2 | 5/2022 |
| EP | 3630607 B1 | 8/2022 |
| EP | 3362356 B1 | 6/2023 |
| EP | 3362360 B1 | 6/2023 |
| GB | 9721844 | 12/1997 |
| GB | 2330382 A | 4/1999 |
| GB | 2544657 A | 5/2017 |
| GB | 2568962 A | 6/2019 |
| GB | 2570767 A | 7/2019 |
| GB | 2607911 A | 12/2022 |
| IN | 102067183 A | 5/2011 |
| KR | 20190037646 A | 4/2019 |
| KR | 20200008411 A | 1/2020 |
| KR | 20200088112 A | 7/2020 |
| KR | 20210149923 A * | 12/2021 |
| SE | 0801299 L | 12/2009 |
| SG | 182025 A | 7/2012 |
| WO | 9919591 A1 | 4/1999 |
| WO | 2007141795 | 12/2007 |
| WO | 2008153269 | 12/2008 |
| WO | 2012094430 | 7/2012 |
| WO | 2015061008 A1 | 4/2015 |
| WO | 2015103411 A1 | 7/2015 |
| WO | 2016094067 A1 | 6/2016 |
| WO | 2016163779 A1 | 10/2016 |
| WO | 2017029611 A1 | 2/2017 |
| WO | 2017066649 A1 | 4/2017 |
| WO | 2017066662 A1 | 4/2017 |
| WO | 2017125084 A1 | 7/2017 |
| WO | 2018213512 A1 | 11/2018 |
| WO | 2018223031 A1 | 12/2018 |
| WO | 2019055685 A1 | 3/2019 |
| WO | 2019055690 A1 | 3/2019 |
| WO | 2019055692 A1 | 3/2019 |
| WO | 2019055702 A1 | 3/2019 |
| WO | 2019111134 A1 | 6/2019 |
| WO | 2019152276 A1 | 8/2019 |
| WO | 2019236729 A1 | 12/2019 |
| WO | 2020018082 A1 | 1/2020 |
| WO | 2020056309 A1 | 3/2020 |
| WO | 2020056311 A2 | 3/2020 |
| WO | 2020063120 A1 | 4/2020 |
| WO | 2021082794 A1 | 5/2021 |
| WO | 2021216397 A1 | 10/2021 |
| WO | 2021216407 A1 | 10/2021 |
| WO | 2022263512 A1 | 12/2022 |
| WO | 2023057450 A1 | 4/2023 |
| WO | 2023083990 A1 | 5/2023 |
| WO | 2023094590 A1 | 6/2023 |

OTHER PUBLICATIONS

International Search Report and Written Opinion dated Apr. 17, 2015, in connection with International Application No. PCT/US2014/073031.
International Preliminary Report on Patentability dated Jul. 14, 2016 in connection with International Application No. PCT/US2014/073031.
Office Action dated Jan. 30, 2017, in connection with Canadian Application No. 2,952,582.
Office Action dated May 12, 2017, in connection with Canadian Application No. 2,952,582.
Office Action dated May 26, 2017, in connection with Chinese Application No. 201480071450.8.
Office Action dated Sep. 1, 2017, in connection with European Application No. 14837087.7.
Examination Report No. 1 dated Jan. 9, 2018, in connection with Australian Application No. 2014373647.
Notice of Acceptance dated Apr. 19, 2018, in connection with Australian Application No. 2014373647.
Combined Search and Examination Report dated Jun. 7, 2018, in connection with Great Britain application No. GB1720150.0.
Extended European Search Report dated Jun. 18, 2018, in connection with European Application No. 17208328.9.
International Search Report and Written Opinion dated Sep. 5, 2018, in connection with PCT/US2018/033059.
Examination Report dated Dec. 20, 2018, in connection with Australian application No. 2018205156.
International Search Report and Written Opinion dated Mar. 14, 2019, in connection with PCT/IB2018/059586.
Examination Report dated May 9, 2019, in connection with Australian application No. 2018205156.
Combined Search and Examination Report dated Jun. 3, 2019, in connection with Great Britain application No. GB1819735.0.
First Office Action dated Aug. 6, 2019, in connection with Chinese Patent Application No. 201810285497.4.
The Office Action dated Oct. 7, 2019, in connection with European Patent Application No. 17208328.9.
Second Office Action dated Mar. 18, 2020, in connection with Chinese Patent Application No. 201810285497.4.
Third Office Action dated Aug. 28, 2020, in connection with Chinese Patent Application No. 201810285497.4.
First Office Action dated Sep. 30, 2020 in connection with Chinese Patent Application No. 201810285496.X.
Office Action dated Dec. 9, 2020, in connection with Australian Patent Application No. 2019283980.
Office Action dated Dec. 9, 2020, in connection with European Patent Application No. 18733018.8.
Extended European Search Report dated Jun. 30, 2021, in connection with European Application No. 21158615.1.
International Search Report and Written Opinion dated Sep. 17, 2021, in connection with International Application No. PCT/US2021/36237.
Second Office Action dated Nov. 11, 2021, in connection with Chinese Patent Application No. 201810285496.X.
Office Action dated Feb. 18, 2022, in connection with European Patent Application No. 18733018.8.
Third Office Action dated Oct. 21, 2022, in connection with Chinese Patent Application No. 201801285496.X.
Office Action dated Dec. 20, 2022, in connection with European Application No. 21158615.1.
Office Action dated Feb. 1, 2023, in connection with Chinese Application No. 201880032552.7.
Office Action dated Feb. 9, 2023, in connection with European Application No. 18733018.8.
Taranovich, "Wireless Power Challenges and Opportunities", <https://www/edn.com/wireless-power-challenges-and-opportunities/>, Jan. 26, 2017, retrieved on May 15, 2023.

(56) References Cited

OTHER PUBLICATIONS

Office Action dated Apr. 27, 2023, in connection with Australian Application No. 2021277738.
Office Action dated May 19, 2023, in connection with Australian Application No. 2018269516.
Extended European Search Report dated Nov. 28, 2023, in connection with European Application No. EP 21821741.2.
Invitation to Pay Additional Fees dated Sep. 1, 2023, in connection with PCT Application No. PCT/US2023/067490.
Fourth Office Action dated Sep. 9, 2023, in connection with Chinese Patent Application No. 201801285496.X.
Office Action dated Oct. 12, 2023, in connection with European Application No. 8733018.8.
Office Action dated Oct. 17, 2023, in connection with European Application No. 21158615.1.
International Search Report and Written Opinion dated Nov. 9, 2023, in connection with PCT Application No. PCT/US2023/067490.
Office Action issued on Nov. 18, 2023, in connection with Chinese Application No. 201880032552.7.
Office Action issued on Mar. 1, 2024, in connection with Chinese Application No. 2018800325527.

* cited by examiner

SECURITY AND GUIDANCE SYSTEMS AND METHODS FOR PARCEL-RECEIVING DEVICES

CROSS-REFERENCE TO RELATED APPLICATION(S)

This application is a continuation of and claims priority benefits from International Application No. PCT/US2021/036237 filed on Jun. 7, 2021, entitled "Security and Guidance Systems and Methods for Parcel-Receiving Devices". The '237 application is related to and claims priority benefits from U.S. Provisional Patent Application No. 63/035,821 filed on Jun. 7, 2020, entitled "Security and Guidance Systems and Methods for Parcel-Receiving Devices". This application also claims priority to the '821 application. The '237 and '821 applications are hereby incorporated by reference herein in their entireties.

FIELD OF THE INVENTION

The present invention relates to security and guidance systems and methods for parcel-receiving devices. In some embodiments, the parcel-receiving devices are receiving delivery from and providing pickup to unmanned aerial vehicles.

Online or remote shopping has grown immensely over the past decade. Remote shopping offers many benefits including: allowing customers to shop from literally anywhere in the world; eliminating the costs associated with having to ship, store, and sell items from traditional retail store locations; and allowing manufacturers and distributors to reach a larger target market.

However, despite these advantages, remote shopping is not without its drawbacks. Most prominent among such drawbacks is the lag time between purchasing an item and having it delivered. With the exception of digital goods that can be downloaded over the internet, most goods purchased by remote shopping need to be delivered to the purchaser's home or business. This usually takes days, if not weeks, and is subject to the intrinsic costs, hazards, and obstacles of traditional parcel/package delivery. The variability in timeframes and distance is due to the inherent drawbacks of the current logistics and transportation models.

Companies are attempting to minimize the delay between purchase and delivery by offering same day delivery in certain cities. However, this can be very costly and inefficient as it requires a large number of employees on call to deliver items as they are purchased. Not only does this increase the delivery cost, but also increases traffic congestion and carbon emissions, as there are more people out making deliveries.

One suggestion in improved delivery service that does not have the drawbacks of conventional same day delivery, is the use of unmanned aerial vehicles/drones. Low flying drones, such as quadcopters and octocopters, can be used to carry and deliver small to medium sized parcels, directly to known locations, using global positioning system technology, machine vision, telemetry, metadata and/or commands from a remote operator. These drones promise to be much more cost effective than human delivery and will likely be faster as they can bypass traffic and are not limited to following paved roads.

As consumer demand for same day delivery rises, drones will rapidly become a viable technology for many delivery services and companies. Companies implementing drones will reach a greater market with less overhead and lower costs than companies using conventional delivery methods.

In light of the movement towards drone delivery, several companies have begun production on parcel-receiving devices, such as landing pads, to meet the coming demand for secure locations for drone delivery, particularly in congested urban areas.

These parcel-receiving devices can be improved by adding guidance and/or security features. In some embodiments, guidance features can help in the delivery or pickup of packages from the parcel-receiving devices. In some embodiments, they improve the rough alignment between where the drones deposit the packages and the package receiving station and/or help secure the packages once received. In some embodiments, these features can be added to current parcel-receiving devices as standalone attachment(s). In some embodiments, these features can be integrated directly into parcel-receiving devices.

In some embodiments, landing stations endure extreme environmental conditions and additional measures are required to protect, among other things, the electro-mechanical, security and/or guidance components. In some embodiments, these measures can effectively protect components such as, but not limited to, motors, sensors, pulleys, belts and/or guides, as well as any cargo packages stored in the landing station from rain, ice, snow, dust and/or debris. In some embodiments, landing stations must protect their interiors and/or their contents from ingress, moisture, contaminants, tampering and/or theft.

In some landing station applications, a secure weather cover is needed to protect the landing station and any packages or drones landed on it from the elements. Various umbrella or awning covers have been proposed, but they are not secure and can be damaged by high winds.

In some landing station applications using package locker doors, these doors can be forced open, compromising security. What is needed is a top cover mechanism and/or package locker door that is highly secure and environmentally robust.

In some landing station applications, when the front door on a package locker is opened, the rear of that locker is open to the interior of the landing station. This can create several potential problems, including the possibility of pushing the package back to the point where it interferes with robotic package handling equipment, knocking the package off its shelf thereby losing it in the interior of the landing station, and/or the introduction of contaminants (either intentional or unintentional) to the interior of the landing station. There is also a concern where after retrieving an authorized package, an unscrupulous user reaches into the landing station, and steals a package from an adjacent locker.

The various embodiments disclosed below, address some, if not all of these issues.

SUMMARY OF THE INVENTION

A landing station guidance-and-security system can include at least one environmental cover; a first guide-and-security bar; a second guide-and-security bar; a third guide-and-security bar; a fourth guide-and-security bar; a housing wherein at least one environmental cover can be retracted into the housing; a gutter; and/or at least one guide track.

In some embodiments, the landing station guidance-and-security system is integrated into a parcel-receiving device.

In some embodiments, the landing station guidance-and-security system is configured to attach to a parcel-receiving device.

In some embodiments, the environmental cover is configured to create a slope when in a closed position.

In some embodiments, the environmental cover is made of canvas.

In some embodiments, the gutter includes a downspout.

In some embodiments, the first guide-and-security bar includes at least one precision rod. In some embodiments, the precision rod is magnetic.

In some embodiments, the first guide-and-security bar and the second guide-and-security bar are on a first plane, and the third guide-and-security bar and the fourth guide-and-security bar are on a second plane.

In some embodiments, the first guide-and-security bar and the second guide-and-security bar run perpendicular to the third guide-and-security bar and the fourth guide-and-security bar.

In some embodiments, the first guide-and-security bar is made of metal.

A method of using a landing station guidance-and-security system is disclosed. A method of transferring a package between an unmanned drone and a parcel-receiving device, wherein said parcel-receiving device includes a landing station guidance-and-security system is also disclosed.

In some embodiments, a drone landing station includes: a magnetic centering mechanism configured to center a drone and/or a package; sliding dovetail doors; a plow bar; at least one roll-up door; a first storage locker; a second storage locker; and/or a solid rear door configured to block access to the second storage locker from the first storage locker when the first storage locker is being accessed by a user.

In some embodiments planar landing station includes at least two storage lockers. In some embodiments, a planar landing station includes at least one piece of robotic equipment configured to move a package into a storage locker.

DETAILED DESCRIPTION OF ILLUSTRATIVE EMBODIMENT(S)

FIGS. 1A-3D show landing station guidance-and-security system 100 in various states of operation. In some embodiments, landing station guidance-and-security system 100 can be attached to a standalone parcel-receiving device. In some embodiments landing station guidance-and-security system 100 is built directly into a parcel-receiving device.

Figure 1A:
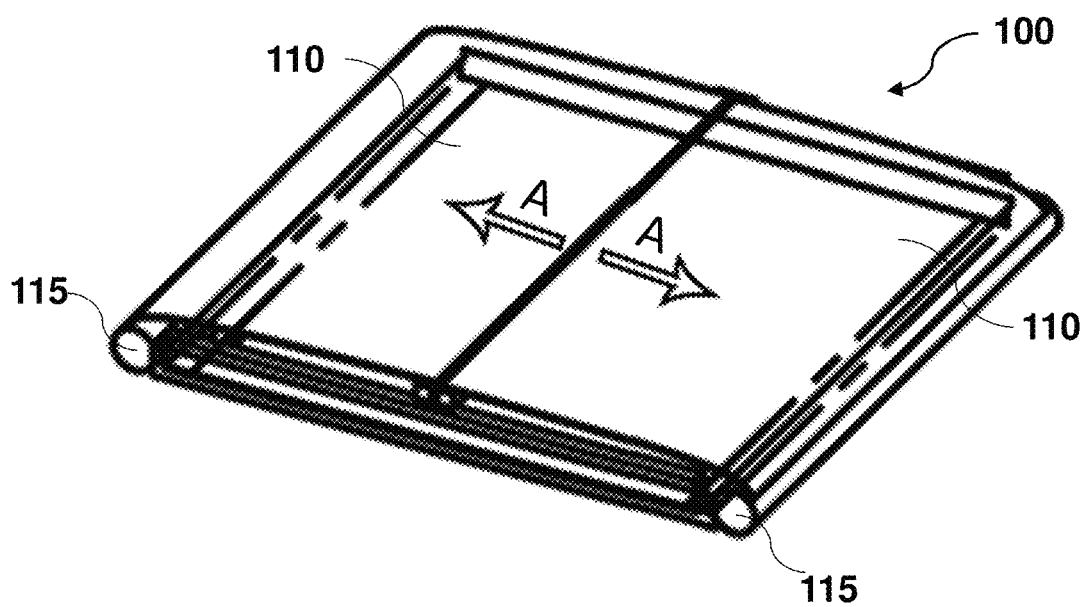
FIG. 1A is a perspective view of a landing station guidance-and-security system with the environmental covers closed.
Figure 2A:
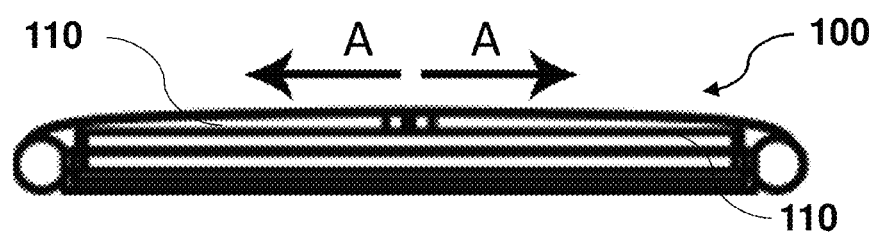
FIG. 2A is a side view of a landing station guidance-and-security system with the environmental covers closed.
Figure 3A:
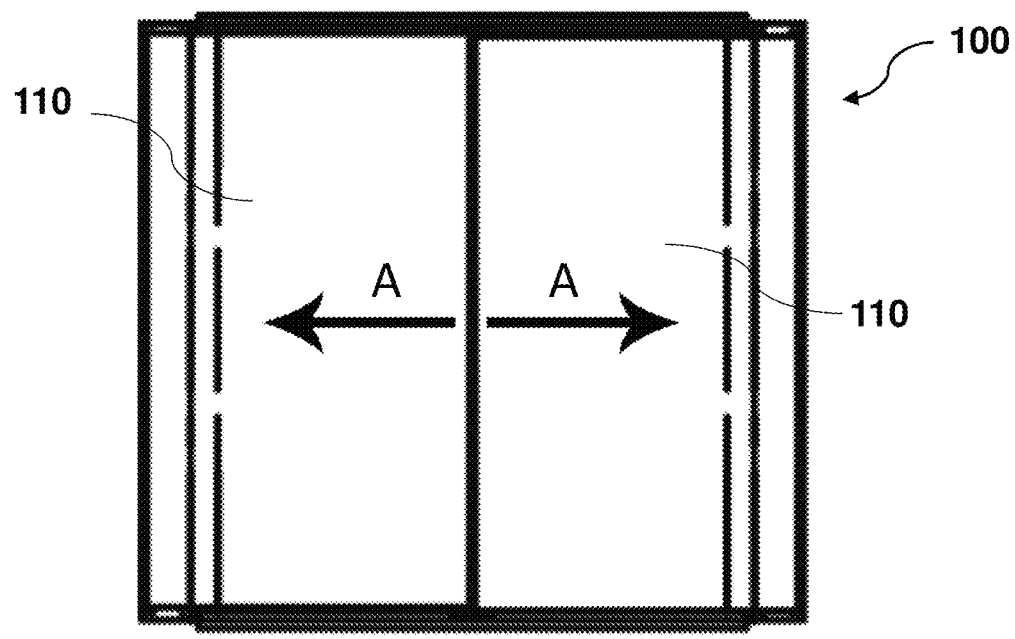
FIG. 3A is a top view of a landing station guidance-and-security system with the environmental covers closed.

In FIGS. 1A, 2A, and 3A, landing station guidance-and-security system 100 is in a completely closed position with environmental covers 110 in a closed position. In at least some embodiments, environmental covers 110 shelter landing station guidance-and-security system 100 and the related parcel-receiving device from outside factors such as, but not limited to, rain, snow, ice, leaves, animal droppings, and/or damaging sunlight. In some embodiments, environmental covers 110 are configured to form a sloped surface when in their closed position to aid with shedding, among other things, water, snow, and debris such as leaves. In some embodiments, environmental covers 110 can be programmed to open and close based on various factors, such as a need to keep the parcel-receiving device at a certain temperature or in anticipation of expected precipitation. In some embodiments, data related to these factors is provided to landing station guidance-and-security system 100 via the cloud.

In some embodiments, such as the one shown in FIGS. 1A, 2A, and 3A, landing station guidance-and-security system 100 includes two environmental covers 110 that can retract into cover housings 115. In some embodiments, a single environmental cover 110 is used to cover landing station guidance-and-security system 100 and the related parcel-receiving device. In some embodiments, four separate environmental covers 110 are used to cover landing station guidance-and-security system 100 and the related parcel-receiving device. In some embodiments, multiple environmental covers 110 (for example two, three, four, or five environmental covers 110) are used to cover landing station guidance-and-security system 100 and the related parcel-receiving device. In some embodiments, four separate environmental covers 110 are used to cover landing station guidance-and-security system 100 and the related parcel-receiving device.

In some embodiments, the ends of environmental covers 110 include a magnet to help aid in creating a seal between the individual environmental covers 110. In some embodiments, the magnets are permanent magnets. In some embodiments, the magnets are electromagnets.

In some embodiments, environmental covers 110 include interconnecting pieces to help aid in creating a seal between the individual environmental covers 110.

In the embodiment depicted by FIGS. 1A, 2A, and 3A, environmental covers 110 retract into cover housings 115 along the direction indicated by arrows A.

In some embodiments, environmental cover 110 is made of, among other things, fabric such as canvas, segmented metal, non-porous materials such as vinyl and other polymers, rubberized nylon, and/or other materials used to create flexible, durable and/or waterproof barriers. In some embodiments, environmental cover 110 can be coated with a hydrophobic material. In some embodiments, environmental cover 110 can be made with a hydrophobic material. In some embodiments, environmental cover 110 includes at least one solar panel.

In at least some embodiments, when environmental covers 110 are retracted into cover housings 115, guide-and-security bars 120 are exposed.

In at least some embodiments guide-and-security bars 120 both protect door 150 to the interior of parcel-receiving device and help guide/align package(s) 300 being picked up or delivered by drone 200.

In some embodiments, guide-and-security bars 120 are configured to open along the direction indicated by arrows B when a package is being picked up or delivered.

In some embodiments, guide-and-security bars 120 are made of, among other things, metals such as aluminum and/or steel, fiberglass, plastics, composites, and/or other rigid materials.

In some embodiments, guide-and-security bars 120 can have direct contact leads on them that can touch drone legs with opposing leads on them to charge the drone. In some embodiments, the contact leads are arranged so at least two different conductors, representing the two polarities of the charging circuit, contact conductive patches on the drone to provide a charging current path. In some embodiments, the contact leads and contact patches have mechanical properties to provide adequate contact force for reliable connections. In some embodiments, magnetic forces are utilized to provide adequate contact force. In some embodiments, the contact leads and contact patches are composed of and/or plated with corrosion resistant materials.

In some embodiments, guide-and-security bars 120 bar off access to door 150 of parcel-receiving device. In some embodiments, landing station guidance-and-security system 100 can enter a more secured state in certain situations, such as when an increase in robberies in a given area has been detected, when landing station guidance-and-security system 100 detects an individual is attempting to break into the parcel-receiving device, and/or when valuable packages 300 are stored in the landing station. In some embodiments, a package is considered valuable if it is worth more than a given amount. In some embodiments, a package is considered valuable if it contains certain types of information, such as medical or bank records. In some embodiments, information about the package is received via a network. In some embodiments, information about the package is received via a drone. In some embodiments, guide-and-security bars 120 can be electrified.

Figure 1B:
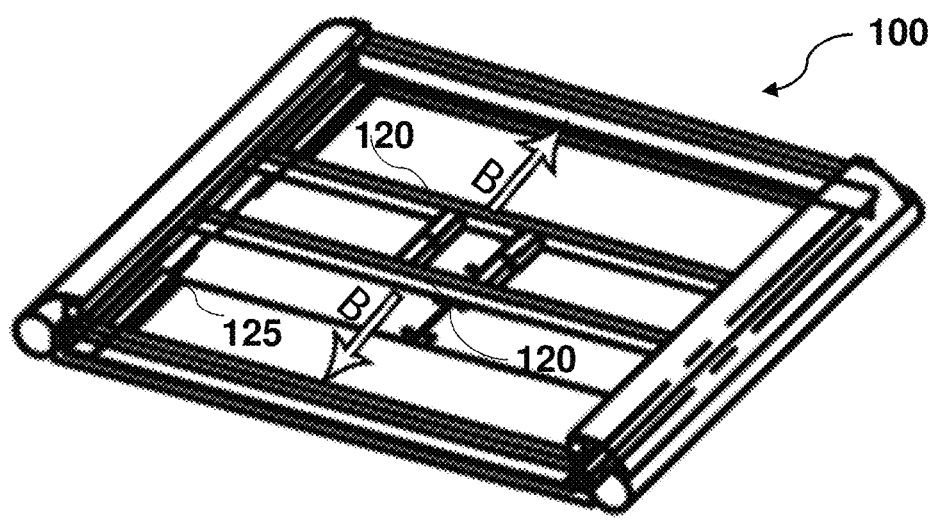
FIG. 1B is a perspective view of a landing station guidance-and-security system with the guide-and-security bars closed.
Figure 2B:
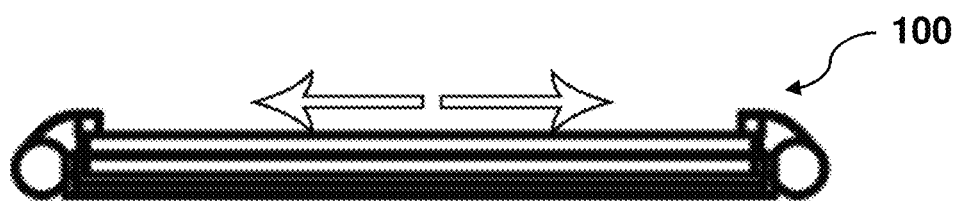
FIG. 2B is a side view of a landing station guidance-and-security system with the guide-and-security bars closed.
Figure 2C:
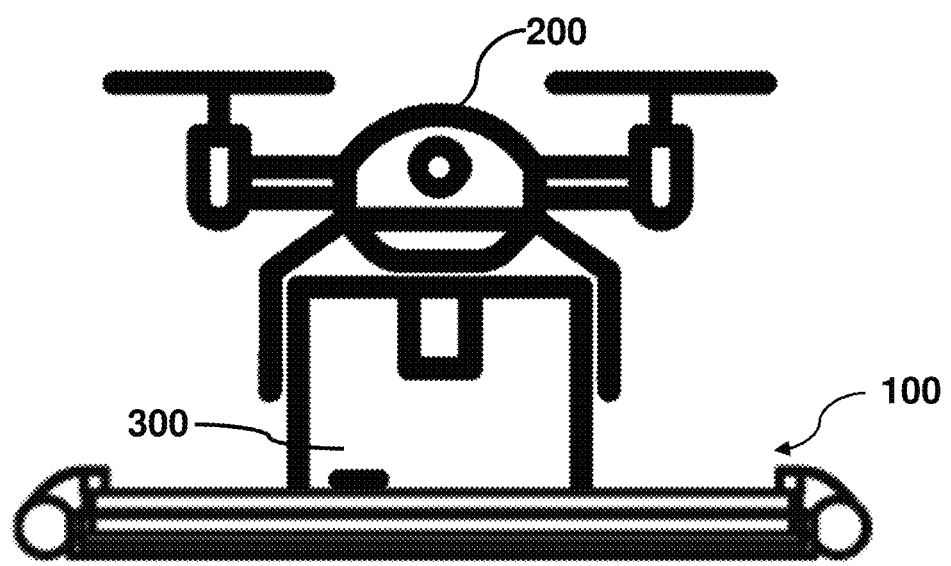
FIG. 2C is a side view of a landing station guidance-and-security system with a drone delivering a package to a parcel-receiving device.
Figure 3B:
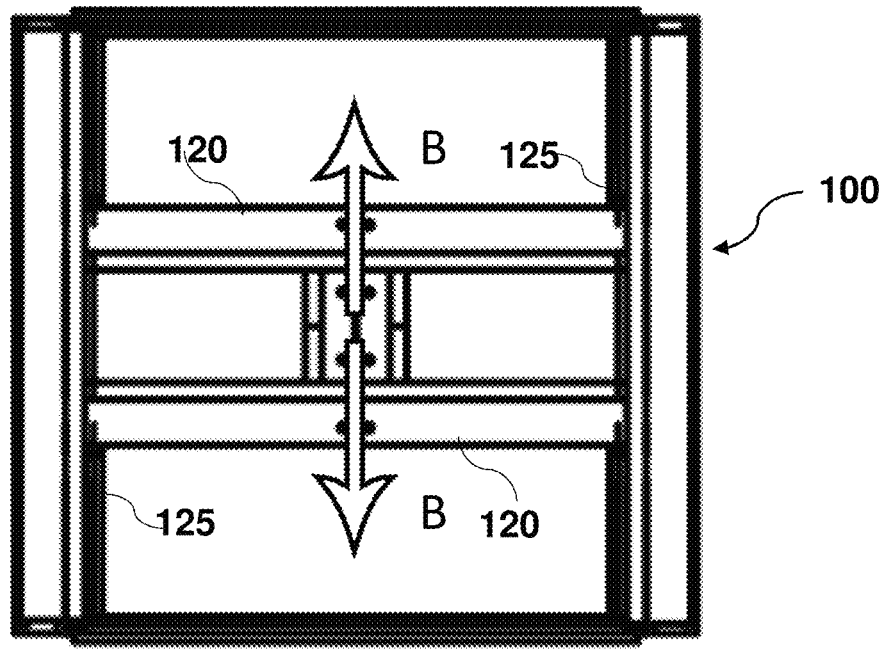
FIG. 3B is a top view of a landing station guidance-and-security system with the guide-and-security bars closed.

In some embodiments, such as the one shown in FIGS. 1B, 2B, and 3B, landing station guidance-and-security system 100 includes two guide-and-security bars 120 that move down guide tracks 125. In some embodiments, landing station guidance-and-security system 100 uses four separate guide-and-security bars 120.

Figure 1C:
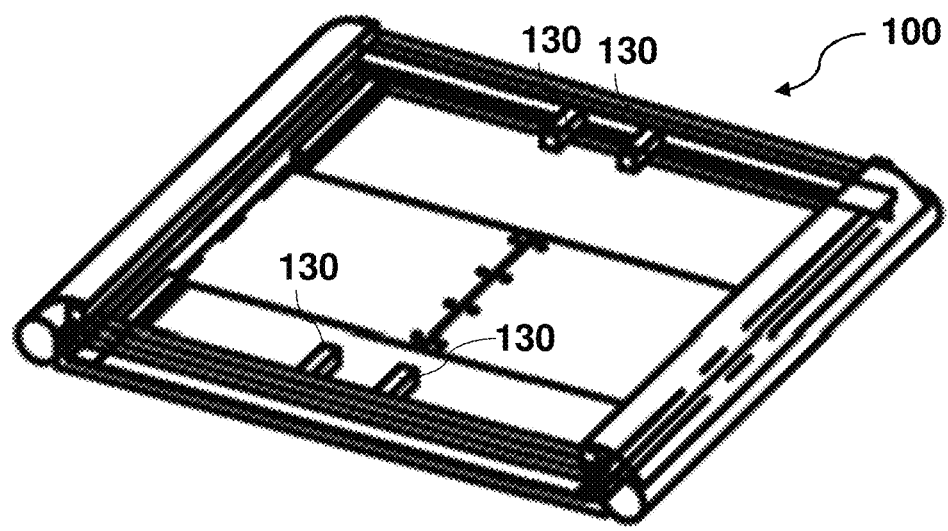
FIG. 1C is a perspective view of a landing station guidance-and-security system with the guide-and-security bars opened.
Figure 1D:
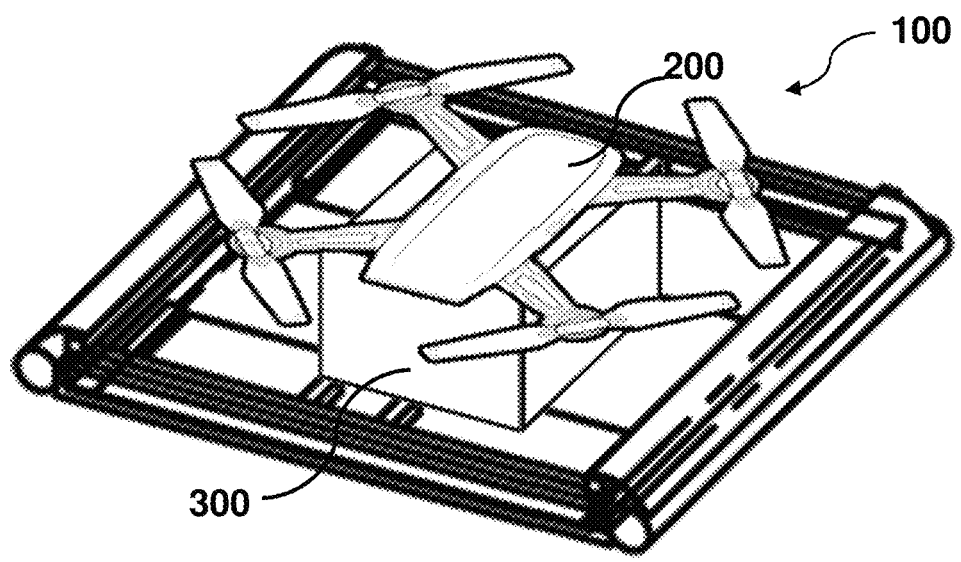
FIG. 1D is a perspective view of a landing station guidance-and-security system with a drone delivering a package to a parcel-receiving device.
Figure 3C:
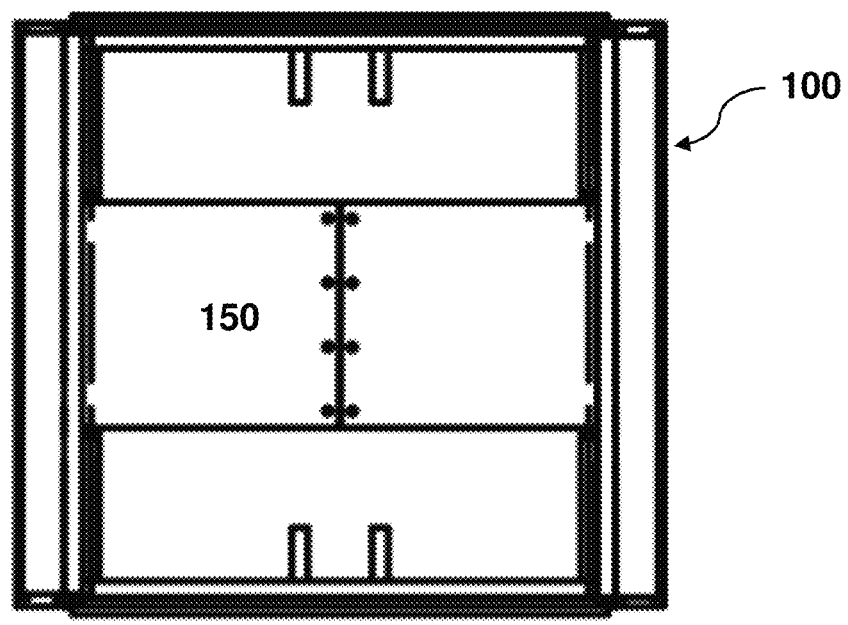
FIG. 3C is a top view of a landing station guidance-and-security system with the guide-and-security bars opened.
Figure 3D:
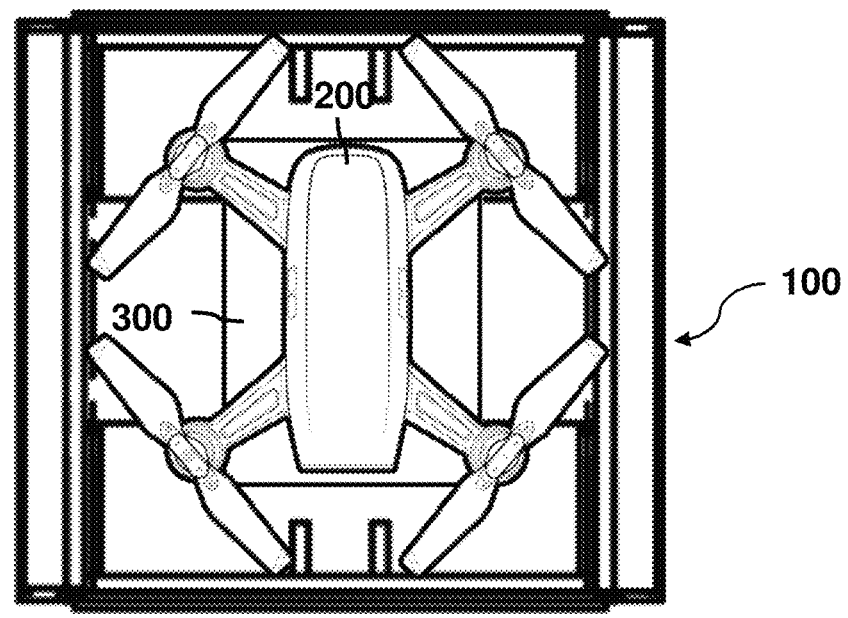
FIG. 3D is a top view of a landing station guidance-and-security system with a drone delivering a package to a parcel-receiving device.

In some embodiments, when a pickup or delivery is imminent guide-and-security bars 120 can enter an open state, such as the one shown in FIGS. 1C and 3C. In some embodiments, guide-and-security bars 120 can help align a package and/or drone for delivery or pickup of the package.

In parcel-receiving devices that utilize shafts or elevators, guide-and-security bars 120 can guide the drone and/or package to better align it with a shaft or elevator.

In some embodiments, guide-and-security bars 120 include precision rods 130. In some embodiments, precision rods 130 act as further guidance for packages and/or drones.

In some embodiments, precision rods 130 are magnetic to better attach to each other and/or an aerial drone. In some embodiments, precision rods 130 are electromagnetic such that the magnetic field can be switched off and on depending on if the drone is arriving or leaving. In some embodiments, precision rods 130 include permanent magnets.

In some embodiments, precision rods 130 lock into each other for additional security. In some embodiments, precision rods 130 include an electronic lock.

In some embodiments, landing station guidance-and-security system 100 is connected to an electrical supply. In some embodiments, the electrical supply can come from a unit housed within the parcel-receiving device. In some embodiments, the electrical supply can be a battery. In some embodiments, the battery acts as a secondary source of power. In some embodiments, the battery can be activated if the primary power is shut-off.

Figure 4:
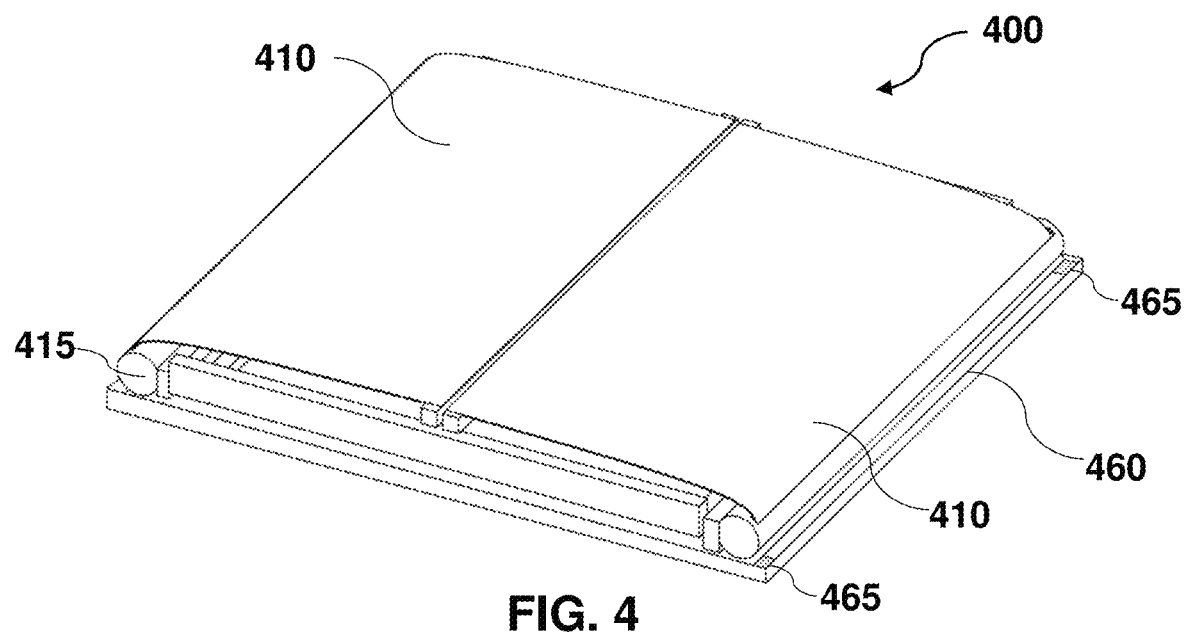
FIG. 4 is a perspective view of a landing station guidance-and-security system with a gutter system.

In some embodiments, such as the embodiment shown in FIG. 4, landing station guidance-and-security system 400 includes gutters 460. In some embodiments, gutters include downspouts 465. In some embodiments, gutters 460 include a mesh top to prevent debris, such as leaves, from clogging them. In some embodiments, downspouts 465 can be connected to stormwater management systems such as storm sewers to direct water and debris away from the base of the landing station. In FIG. 4, landing station guidance-and-security system 400 includes two environmental covers 410 that can retract into cover housings 415.

Figure 5:
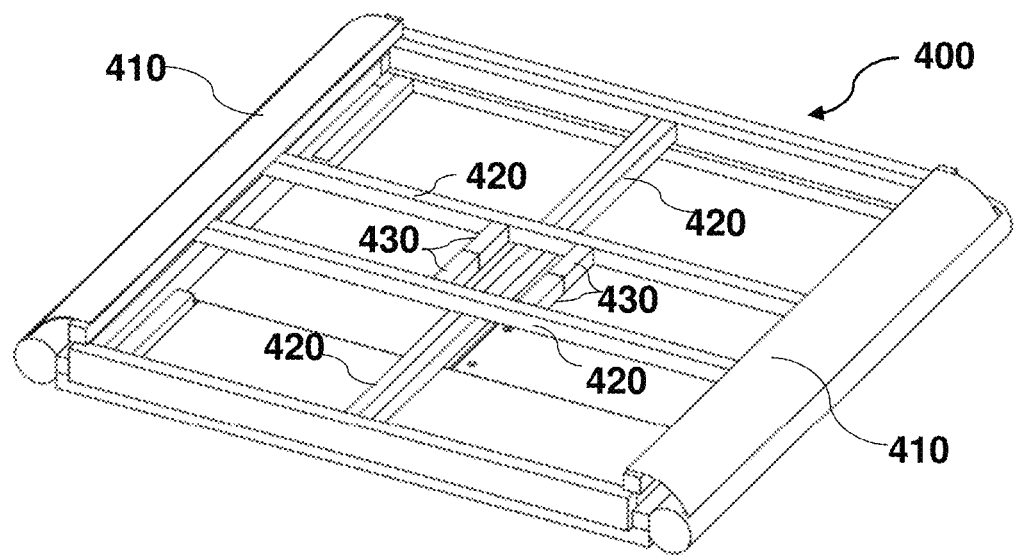
FIG. 5 is a perspective view of a landing station guidance-and-security system with four guide-and-security bars.

In some embodiments, such as the embodiment shown in FIG. 5, landing station guidance-and-security system 400 includes four guide-and-security bars 420. In some embodiments, guide-and-security bars 420 include precision rods 430. In some embodiments, some of the functions of environmental covers 410, security bars 420, and/or drone/package centering devices are combined into a single robotic axis to save space, power and/or cost.

In some embodiments, landing station guidance-and-security capabilities are magnetically coupled from below the landing surface. In some embodiments, this can reduce the exposure of sensitive robotic sensors and actuators to moisture and contaminants. In some embodiments, the functions of guidance and security bars 120 can be located below the landing surface. In some embodiments, forces exerted by actuators to center and/or secure a drone act through the thickness of the landing surface via magnetic attraction.

Figure 6:
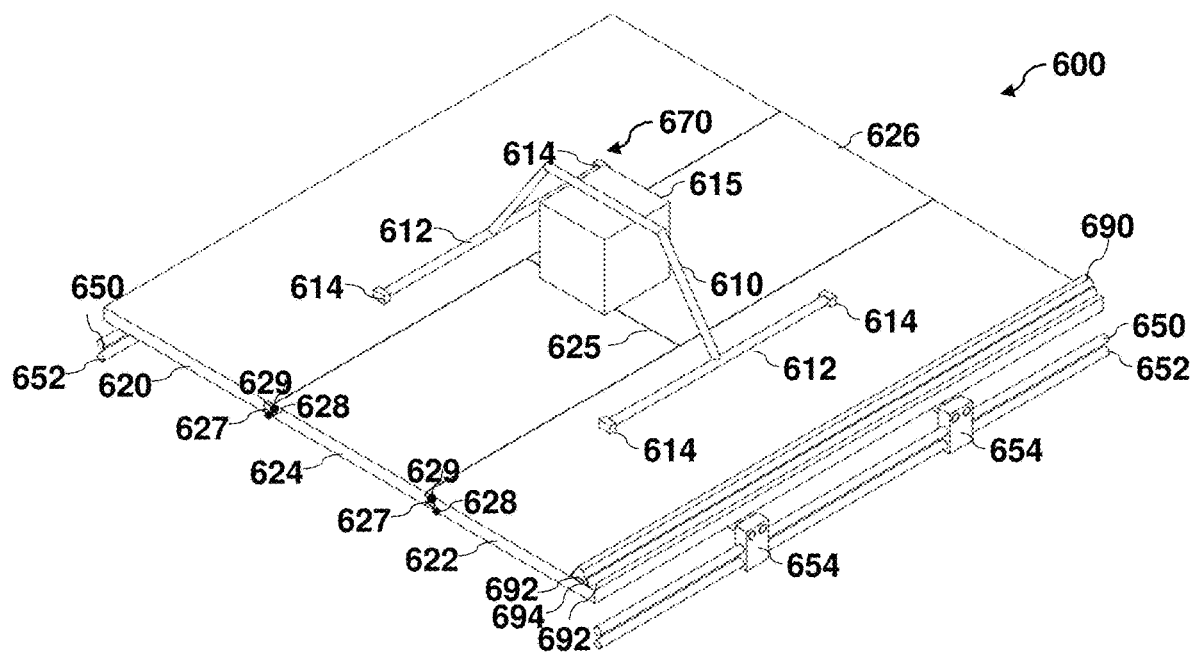
FIG. 6 is a perspective top view of a landing station with magnetic centering and dovetail doors.
Figure 7:
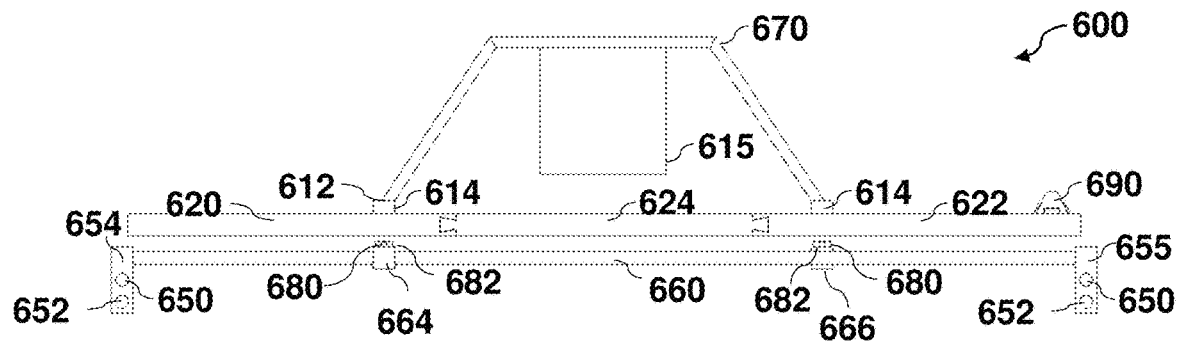
FIG. 7 is a front view of a landing station with magnetic centering and dovetail doors in the closed position.
Figure 8:
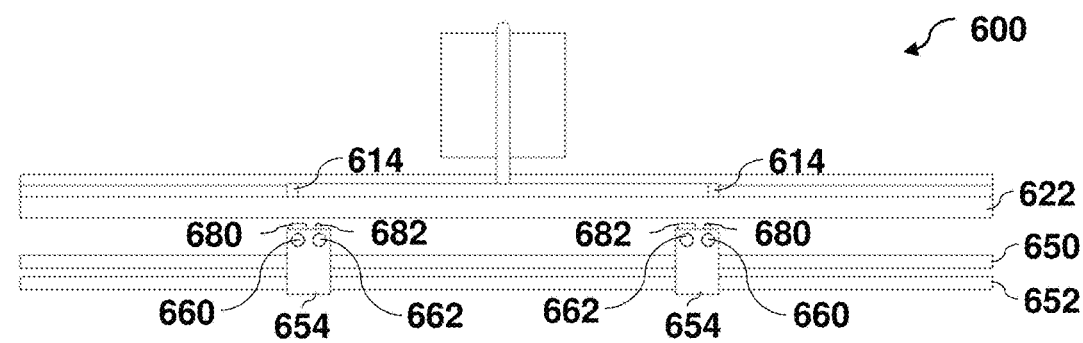
FIG. 8 is a side view of a landing station with magnetic centering and dovetail doors.

FIGS. 6-8 illustrate a drone landing station that uses magnetic centering and sliding dovetail doors. For illustrative purposes, parts of the drone landing station have been omitted from the drawings. In at least some embodiments of a drone landing station, a magnetic centering mechanism is utilized to align packages to the interior of the landing station. In at least some embodiments of a drone landing station, a system of sliding dovetail doors admits packages to the interior of the landing station.

In some embodiments, such as the one shown in FIG. 6, magnetic centering and dovetail door system 600 acts upon frame 610 and/or landing skids 612 of drone 670, delivering package 615. In FIG. 6, various parts of drone 670, such as, but not limited to, rotors, batteries, control and communications systems are omitted for clarity. In some embodiments, drone landing skids 612 include at least one magnet 614. In some embodiments, drone landing skids 612 include at least two magnets 614. In some embodiments, drone landing skids 612 include four magnets 614. In some embodiments, magnet(s) 614 is/are permanent magnet(s). In some embodiments, magnet(s) 614 is/are electromagnet(s). In some embodiments, the magnetic orientation of magnets 614 is substantially perpendicular to the landing surface—for example, the north pole pointing up and the south pole pointing down.

In some embodiments, the landing station's landing surface is made from a magnetically permeable material. In some embodiments, the landing surface is made from a waterproof material. In some embodiments, the landing surface is made from a water-resistant material. In some embodiments, landing surface is made from a material that is slippery with a low coefficient of friction. In some embodiments, the landing station's landing surface is made from a magnetically permeable, waterproof, and slippery material. such as, but not limited to, polyethylene, Delrin® or nylon. In some embodiments, such as the one show in FIG. 6, the surface is divided into four parts, first stationary cover 620, second stationary cover 622, first sliding cover 624 and second sliding cover 626. In other embodiments the surface can be divided into various number of stationary and/or sliding parts. In the closed position as shown in FIG. 6, first sliding cover 624 and second sliding cover 626 meet at parting line 625. In some embodiments, parting line 625 contains weather stripping. In some embodiments, first stationary cover 620 and/or second stationary cover 622, interface with first sliding cover 624 and/or second sliding cover 626 via one or more sliding dovetail joints 627. In some embodiments, labyrinth seals and/or dado joints can be utilized instead of or with dovetail joints.

In some embodiments, dovetail joints 627 include features to improve their environmental robustness. In some embodiments, drainage channels 628 collect moisture that can seep into dovetail joints 627 and channel it away from the landing surface. In some embodiments, at least one joint heater 629 is present. In some embodiments, joint heater 629 is an electrical heating element embedded in the female dovetails in first stationary cover 620 and/or second stationary cover 622 that can be activated to prevent, or at least reduce the likelihood that one or more dovetail joints 627 freeze. In some embodiments, joint heater 629 can be automatically activated when a given parameter is met, for example the outside temperature going below a predetermined threshold. In some embodiments, joint heater 629 can be activated based on a planned delivery and/or pickup, such that the joint can be unfrozen before a drone arrives.

In some embodiments, such as shown in FIG. 6, first stationary cover 620, second stationary cover 622, first sliding cover 624 and second sliding cover 626 form a substantially continuous, weatherproof, contamination-proof plane. In at least some embodiments, joints in this continuous plane such as the exposed joints in dovetails 627 and parting line 625 are smooth enough that drone skids 612 and magnets 614 can slide over them without significant disruption.

FIG. 7 is a front view of magnetic centering and dovetail door system 600. FIG. 7 shows an example drive mechanism that can move drone skids 612 or package 615 resting on first stationary cover 620, second stationary cover 622, first sliding cover 624, and/or second sliding cover 626. In some embodiments, the drive mechanism utilizes at least one robotic gantry and electromagnets whose fields penetrate first stationary cover 620, second stationary cover 622, first sliding cover 624 and/or second sliding cover 626 and interact with magnets 614. In some embodiments, a pair of robotic gantries are used. In at least some embodiments, the interaction produces forces capable of moving drone 670 and/or packages 615 about the landing surface without direct physical contact with either drone 670 and/or package 615. In at least some embodiments, this prevents, or at least reduces, exposing robotic components to environmental factors such as rain.

In at least some embodiments, the robotic gantries comprise X-Axis guide rods 650 and actuators 652 that move X-Axis carriages 654 along their length. In at least some embodiments, Y-Axis guide rods 660 and actuators 662 (shown on FIG. 8) move first Y-Axis carriage 664 and second Y-Axis carriage 666 along their length. In at least some embodiments, linear actuators 652 and/or 662 can be of various types, including, but not limited to, belt, chain, leadscrew, rack and pinion, linear motor, hydraulic or pneumatic. In some embodiments, first Y-Axis carriage 664 is closer to the front of magnet centering and dovetail door system 600 than second Y-Axis carriage 666. In some embodiments, control software manages the relative position of first Y-Axis carriage 664 and second Y-Axis carriage 666 so the two Y-Axis carriages do not collide.

In at least some embodiments, Y-Axis carriages 664 and 666 include at least one magnet 680 and/or at least one sensor 682. In some embodiments, magnet(s) 680 is/are a permanent magnet(s). In some embodiments, magnet(s) 680 is/are an electromagnet(s). In some embodiments, magnet 680 and/or sensor 682 are maintained near to, but not touching the underside of first stationary cover 620, second stationary cover 622, first sliding cover 624, and/or second sliding cover 626 by the mechanical rigidity of the robotic gantries. In some embodiments, magnets 614 attached to a drone landing skid 612 produce a magnetic field that penetrates first stationary cover 620, second stationary cover 622, first sliding cover 624, and/or second sliding cover 626, and can be detected by sensors 682. In some embodiments, when drone 670 lands, the robotic gantries move Y-Axis carriages 664 and 666 in a search pattern enabling sensors 682 to identify the center location of magnets 614. In some embodiments, magnets 680 are then energized in a polarity that attracts magnets 614. In some embodiments, as the gantry components are moved by guide rods and actuators 650, 652, 660 and 662, magnets 614 cause the drone attached to them to be dragged across the first stationary cover 620, second stationary cover 622, first sliding cover 624, and/or second sliding cover 626, thus moving drone 670 and/or package 615 to the desired position. In some embodiments, Y-axis carriages 664 and 666 coordinate their movements to attract two different magnets 614, and translate and rotate the drone above, under computer control.

In some embodiments, drone 670 does not actually land on the surface, but is still guided by the interaction between magnet(s) 614 and magnet(s) 680.

In some embodiments, when drone frame 610 and/or package 615 are centered above parting line 625, first sliding cover 624 and/or second sliding cover 626 are opened, and package 615 can be drawn into the landing station for storage or processing. In some embodiments, first sliding cover 624 and/or second sliding cover 626 are moved by rack and pinion drives or other types of linear actuators. In some embodiments, when first sliding cover 624 and/or second sliding cover 626 close, magnets 614 are released by deenergizing magnets 680, allowing drone 670 to depart. In some embodiments, magnets 680 can be temporarily reversed in polarity, providing a repulsive force to accelerate the takeoff of drone 670. In some embodiments, the robotic gantries can return to their home positions, ready for the arrival of the next drone.

FIG. 8 is a side view, clarifying the interactions between the X-Axis guide rods and actuators 650 and actuators 652, and Y-Axis guide rods 660 and actuators 662. FIG. 8 also illustrates the interactions between magnets 680 and sensors 682 with magnets 614, first stationary cover 620, second stationary cover 622, first sliding cover 624, and second sliding cover 626.

In some embodiments, such as the one shown on FIG. 6, plow bar 690 enables the magnetic centering and dovetail door system 600 to clear the top surfaces of first stationary cover 620, second stationary cover 622, first sliding cover 624, and/or second sliding cover 626 of contaminants such as, but not limited to rain, snow, ice, leaves dirt and debris. In some embodiments, this is done automatically. In some embodiments, plow bar 690 includes squeegees 692 on one or both sides to scrape contaminants off the landing surface. In some embodiments the contaminants are pushed off the side of the landing station and/or into a gutter, such as gutter 460 shown in FIG. 4.

In some embodiments, magnet(s) 694 affixed to the underside of plow bar 690 interact with magnets 680 and the robotic gantry components to permit the bar to be moved in arbitrary patterns, supplying adequate force to plow contaminants from first stationary cover 620, second stationary cover 622, first sliding cover 624, and/or second sliding cover 626. In some embodiments, magnet(s) 694 is/are a permanent magnet(s). In some embodiments, magnet(s) 694 is/are an electromagnet(s). In some embodiments, during given periods, such as times of heavy snow and/or autumn leaf accumulation, the plowing process can be started periodically to keep first stationary cover 620, second stationary cover 622, first sliding cover 624, and/or second sliding cover 626 clean. In some embodiments, plow bar 690 is returned to its resting position at the edge of second stationary cover 622 before a drone lands.

Figure 9:
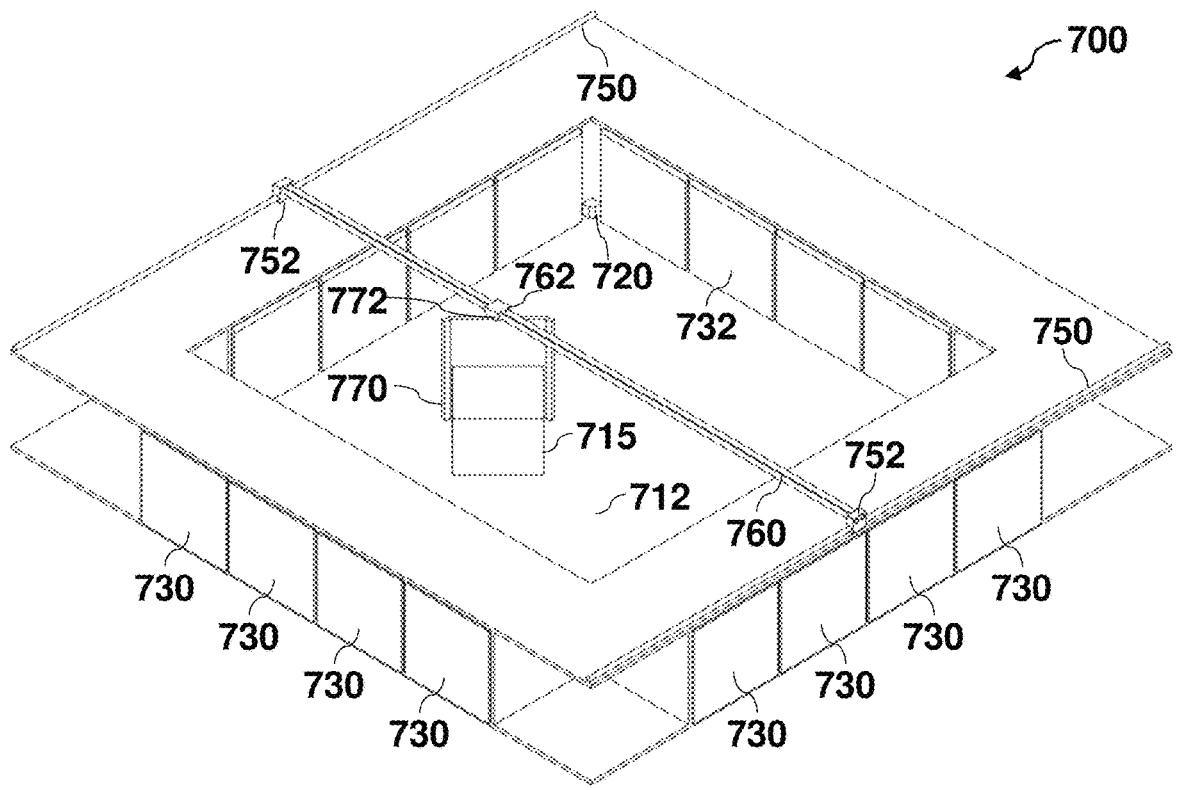
FIG. 9 is a top perspective view of a planar landing station with integrated cargo lockers and drone hangers that has received a package.

In some embodiments (such as shown in FIG. 9), landing station package lockers can be arranged around the periphery of, and in approximately the same plane as the drone landing surface. Keeping package lockers on a single plane that the drone delivers the package can, at least in some embodiments, improve efficiency of the system and/or reduce the need of expensive equipment such as package elevators.

FIG. 9 is a perspective view of planar landing station 700. In some embodiments planar landing station 700 includes landing surface 712 onto which a drone delivers a package 715. In some embodiments robotic equipment moves package 715 into package locker 730 surrounding landing surface 712. In some embodiments, this is done via computer control.

In some embodiments, the floor of package locker 730 can tilt to allow a package to slide onto landing surface 712. This can be helpful for embodiments, where a package is meant to be picked up from planar landing station 700.

In at least some embodiments, planar landing station 700 contains a plurality of package lockers 730 on one or more sides. In the embodiment shown in FIG. 9, package locker 732 has been designated as the storage location for package 715.

In some embodiments, sensor 720 detects the position and orientation of package 715 upon landing surface 712. In some embodiments, sensor 720 can consist of an optical scanner, proximity detector, and/or camera with image analysis software.

In some embodiments, the robotic equipment that manipulates package 715 based upon readings from sensor 720 includes X-axis guide rails and actuators 750 that move X-axis carriages 752. In some embodiments, Y-axis guide rail and actuator 760 moves Y-axis carriage 762. In some embodiments, rotary actuator 772 pivots pusher-door assembly 770. In some embodiments, pusher-door assembly 770 manipulates package 715 by pushing it into selected package locker 732. In some embodiments, actuators 750, 760 and/ and 772 can be of various types including, but not limited to, belt, chain, leadscrew, rack and pinion, linear motor, harmonic, hydraulic or pneumatic.

Figure 10:
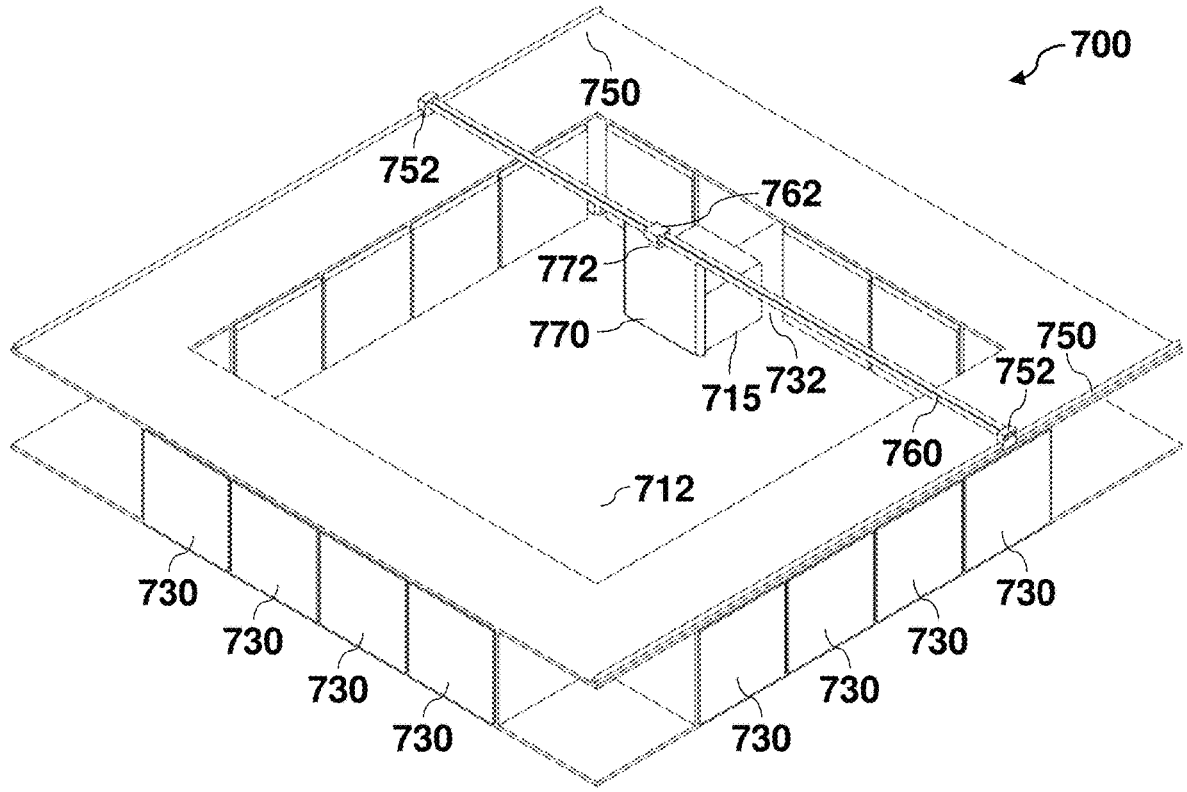
FIG. 10 is a top perspective view of a planar landing station with integrated cargo lockers and drone hangers that is completing its package storage cycle.

FIG. 10 shows the robotic equipment is nearing completion of its package storage cycle in which guide rails and actuators 750, 760 have pushed package 715 into position, and rotary actuator 772 has correctly oriented it to be received into designated package locker 732. In some embodiments, X-axis guide rails and actuators 750 will drive X-axis carriages 752 a bit further until pusher-door 770 seals designated storage locker 732 with package 715 inside. In some embodiments, at that point, rotary actuator 772 disconnects from pusher-door 770, sealing package 715 into designated storage locker 732, and the robotic equipment moves X-axis carriages 752 and Y-Axis carriage 762 to a home position. In some embodiments, this home position clears landing surface 712 for the arrival of the next drone. In some embodiments, the connection and disconnection between pusher-door 770 and the outer frame of storage lockers 730, 732 can be, among other things, mechanical latches, magnetic clasps, mortises, or other means.

In some embodiments, at least one package storage locker is large enough to accommodate full size drone. In some embodiments, when a drone lands and needs to be temporarily stored at the landing station, pusher-door 770 moves it into one of the storage lockers where it can be secured, protected from the elements, recharged, or uploaded/downloaded.

In some embodiments, environmental cover functions for the landing surface and guidance-and-security mechanisms are combined with the front security door functions of the package lockers. In some embodiments, this can eliminate the need for several actuators and mechanical components for the cover and front security door by combining multiple functions into a single robotic degree of freedom.

Figure 11:
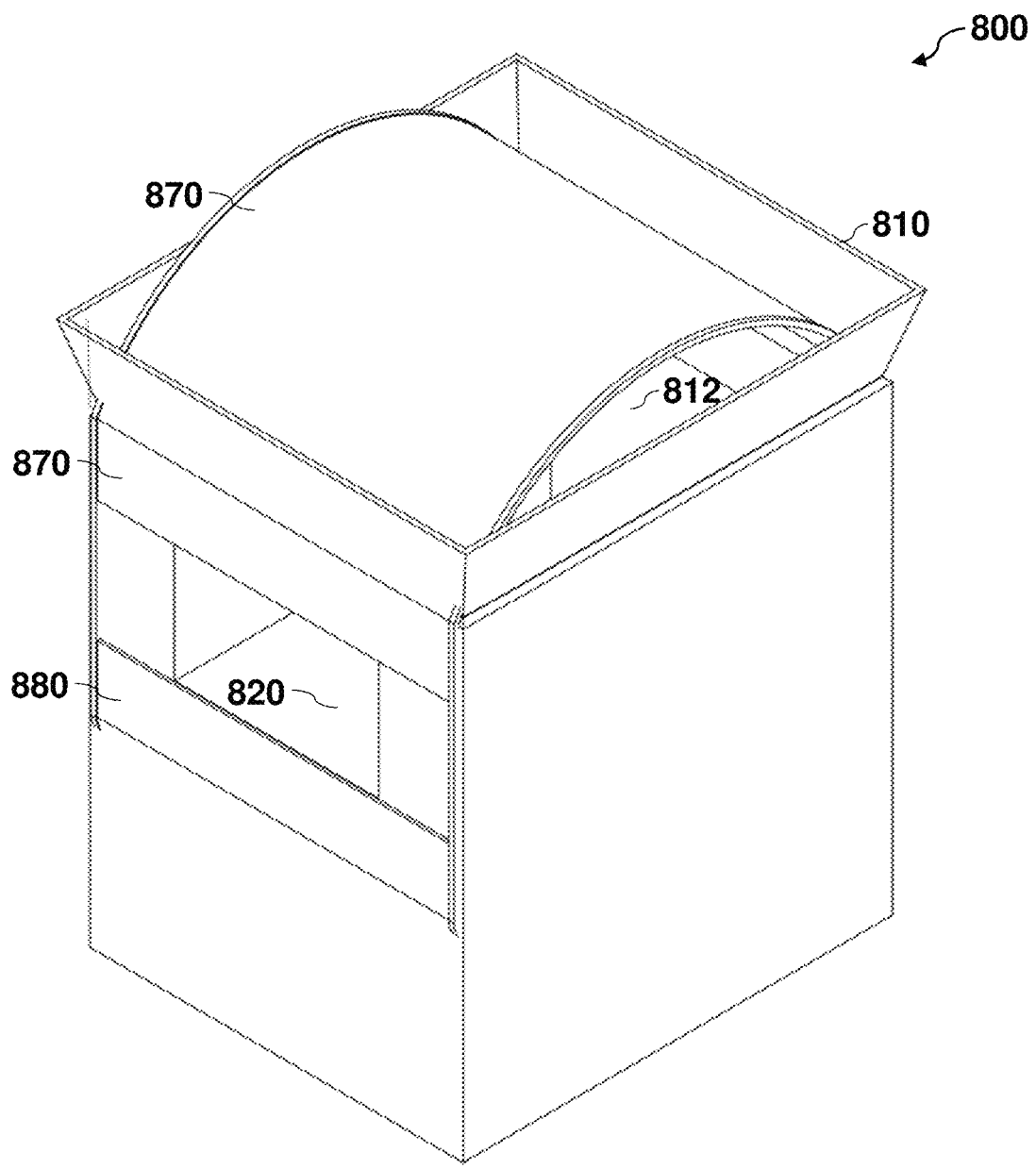
FIG. 11 is a perspective view of a landing station with two roll-up doors to protect the landing surface and centering mechanism and provide secure access to package lockers.

In some embodiments, such as the one shown in FIG. 11, a set of interconnected moving slats form a roll-up door, similar to those found on roll-top desks or the rear roll-up doors on cargo trucks. In some embodiments, these can be formed out of tough metal or composite slats interconnected by a flexible, waterproof membrane. In some embodiments, two of these rolling doors are used, sharing a common curved track on either edge. In some embodiments, the track can be routed to cover the array of package lockers and/or the top cover. In some embodiments, the rolling doors wind onto two motorized reels that play them out or retract them under computer control. In some embodiments, sensors report how far each rolling door is extended.

FIG. 11 is a perspective view of a drone landing station 800 with roll-up doors. In some embodiments, landing station 800 includes centering mechanism 810, which can include magnetic centering and dovetail doors such as discussed above. In some embodiments, landing surface 812 provides a platform for a drone to land on and/or make package deliveries or pickups. In some embodiments, package locker 820 secures packages as they await delivery. Although only one package locker 820 is shown for clarity, drone landing stations, such as drone landing station 800 can have many package lockers, arranged side-by side, one above the other, on multiple sides of the landing station, or combinations of these arrangements.

FIG. 11 represents the roll-up doors in a configuration that enables retrieval of a package from package locker 820. In FIG. 11 first roll-up door 870 extends from the rear of landing station 800, over landing surface 812, and to the top of package locker 820. Second roll-up door 880 extends from the bottom of package locker 820 into the lower front of landing station 800. In some embodiments, first and/or second roll-up doors 870, 880 are motorized. In some embodiments, roll-up doors 870 and/or 880 can be retracted and/or extended under computer control.

Figure 12:
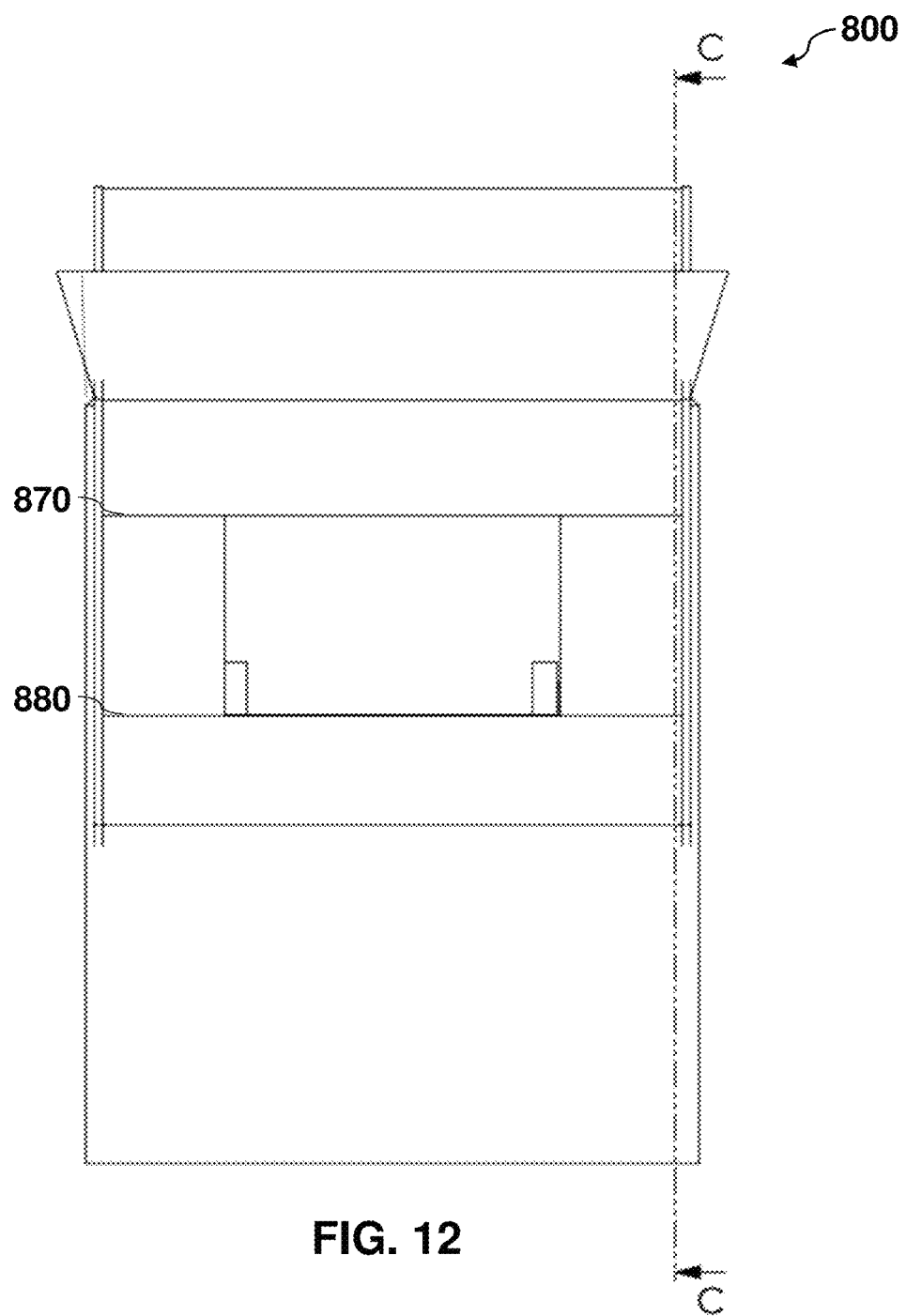
FIG. 12 is a front view of a landing station using two roll-up doors to protect the landing surface and centering mechanism and provide secure access to package lockers.

FIG. 12 is a front view of drone landing station with roll-up doors 800. FIG. 12 illustrates the position of first roll-up door 870 and second roll-up door 880.

Figure 13:
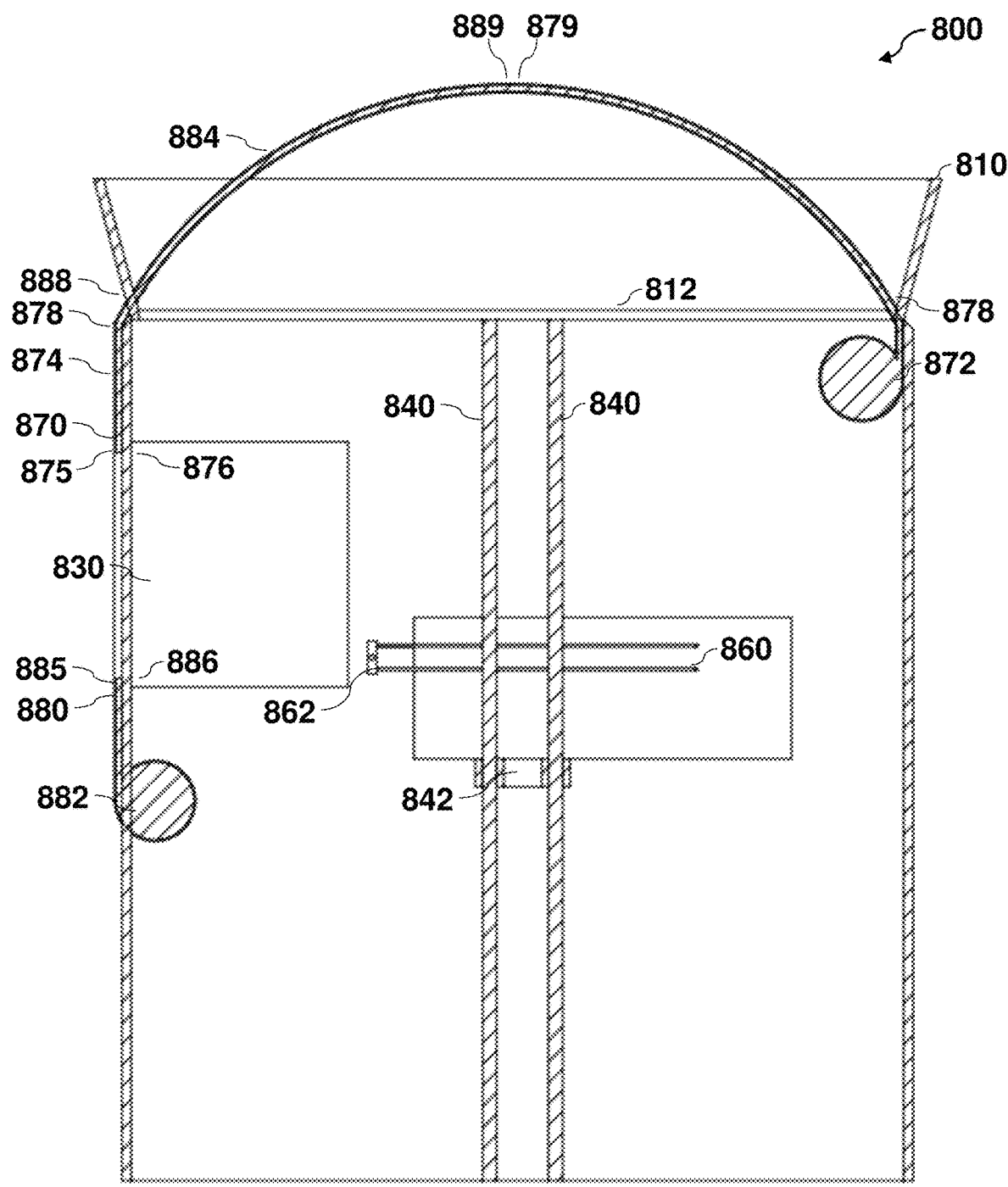
FIG. 13 is a cross-sectional side view of the landing station of FIG. 12 taken in the direction of arrows C-C.

FIG. 13. is a side view through section C-C on FIG. 12. In some embodiments, robotic package handling equipment removes package(s) from the centering mechanism 810 and moves it into one of a plurality of package lockers 830. In some embodiments, this is done via computer control.

In some embodiments, package handling mechanism comprises elevator guides and actuators 840 that move elevator platform 842 to one of several levels within drone landing station with roll-up doors 800. In some embodiments, Y-Axis guides and actuator 860 moves gripper platform 862 to insert and/or remove package(s) from package locker 830. In some embodiments, elevator guides and actuators 840 and Y-Axis guides and/or actuator(s) 860 can be of various types, including but not limited to, belt, chain, leadscrew, rack and pinion, linear motor, hydraulic or pneumatic, under computer control.

In some embodiments, first motorized reel 872 retracts and extends first roll-up door 870 under computer control. In some embodiments, second motorized reel 882 retracts and extends second roll-up door 880. In some embodiments, roll-up doors 870, 880 are constructed from materials that are rigid and strong enough to withstand weather-induced forces and physical abuse such as metal, fiberglass, durable plastics, graphite composite or carbon fiber composite. In some embodiments, they are constructed from a number of interlocked slats with flexible, weatherproof membranes between them. In some embodiments, one or more sprockets integrated into first reel 872 and second reel 882 keeps the doors 870 and/or 880 from slipping as the motorized reels turn. In some embodiments, at least one sensor integrated into motorized reels 872 and/or 882 monitors how far roll-up doors 870 and/or 880 are extended or retracted.

In some embodiments, front guide track 874 and top guide track 884 guide roll-up doors 870 and/or 880 as drive reels 872 and 882 extend and retract them. In some embodiments, front guide track 874 allows the first roll-up door 870 to securely cover all or some of the package lockers 830. In some embodiments, top guide track 884 curves over the top of centering mechanism 810, allowing second roll-up door 880 to securely cover the landing surface 812 of drone landing station with roll-up doors 800. In some embodiments, front guide track 874 and top guide track 884 meet seamlessly at location 878. In some embodiments, this allows first roll-up door 870 to be driven partially into front guide track 874, and/or second roll-up door 880 to be partially driven into top guide track 884.

In some embodiments, the leading edge of first roll-up door 870 is equipped with sensing and sealing device 875. In some embodiments, second roll-up door 880 is equipped with sensing and sealing device 885. In some embodiments, in their normal resting states, motorized reels 872, 882 drive roll-up doors 870, 880 to a position where sensing and sealing devices 875, 885 are in contact with each other with sufficient force to create a weather seal. In some embodiments, sensing and sealing devices 875, 885 include contact sensors to detect collision with an obstruction as the doors move. In some embodiments, when contact is sensed, it causes the doors to stop or reverse direction, preventing, or at least reducing, among other things, body parts being caught, motors being overloaded, and the like.

In some embodiments, when the landing station with roll-up door 800 is at rest (not receiving a drone or retrieving a package), the top roll-up door is positioned so second sensing and sealing device 885 is at position 889, and first sensing and sealing device 875 is at position 879, thus sealing landing surface 812 at its center. In some embodiments, when a drone is approaching either to deliver or retrieve a package, first motorized reel 872 drives first roll-up door 870 to locate front sensing and sealing device 875 at the position marked 878. In some embodiments, simultaneously, second motorized reel 882 drives second roll-up door 880 to position its sensing and sealing device 885 at the position marked 888. In some embodiments, this creates a wide opening into which the drone can descend. In some embodiments, once the drone has landed, the doors can be driven back to positions 879 and 889 to reseal the top, protecting the drone inside the roll-up doors 870 and 880.

In some embodiments, when a user requests to retrieve a package, for example from package locker 830, first motorized reel 872 drives first roll-up door 870 to locate first sensing and sealing device 875 at the position marked 876. In some embodiments, simultaneously, second motorized reel 882 drives second roll-up door 880 to position its sensing and sealing device 885 at the position marked 886. In some embodiments, this creates an opening through which the user can retrieve a package from storage locker 830. In some embodiments, once the system verifies that the package is removed and the user's body parts are clear, the system drives the roll-up doors back to positions 879 and 889, sealing both the landing surface 812 and package locker 830. In some embodiments, if other package lockers adjacent to package locker 830 need to be accessed, the system can drive the first and second roll-up doors 870 and 880 to positions that expose only the desired package locker. In some embodiments, as the doors are in motion, the system is programmed to keep sensing and sealing devices 875 and 885 in close proximity to each other, preventing the infiltration of contaminants or moisture, and maintaining the security of the packages.

In some embodiments, protection doors are provided at the rear of the package lockers to improve security and prevent moisture and contaminant ingress while packages are being retrieved. In some embodiments, a pivoting rear door rides on the same elevator robotics that moves the packages inside the landing station. In some embodiments, when a package is about to be retrieved by a user, the elevator moves to a position that allows a back door (which is attached to the gripper drive platform) to pivot into place, completely (but temporarily) covering the entire back aperture of the package locker. In some embodiments, at that point, the front door can be unlatched, and the user can retrieve the package. In some embodiments, weatherstripping on the pivoting back door seals out contaminants. In some embodiments, the physical barrier the back door provides makes it impossible, or at least unlikely, for the package to fall down into the landing station. In some embodiments, it blocks the ingress of contaminant. In some embodiments, it is impossible, or at least very difficult, for a hand to get past the back door to steal packages from adjacent lockers. In some embodiments, once the package locker doors have closed, the back door is pivoted out of the way, and the package elevator and gripper return to normal service.

Figure 14:
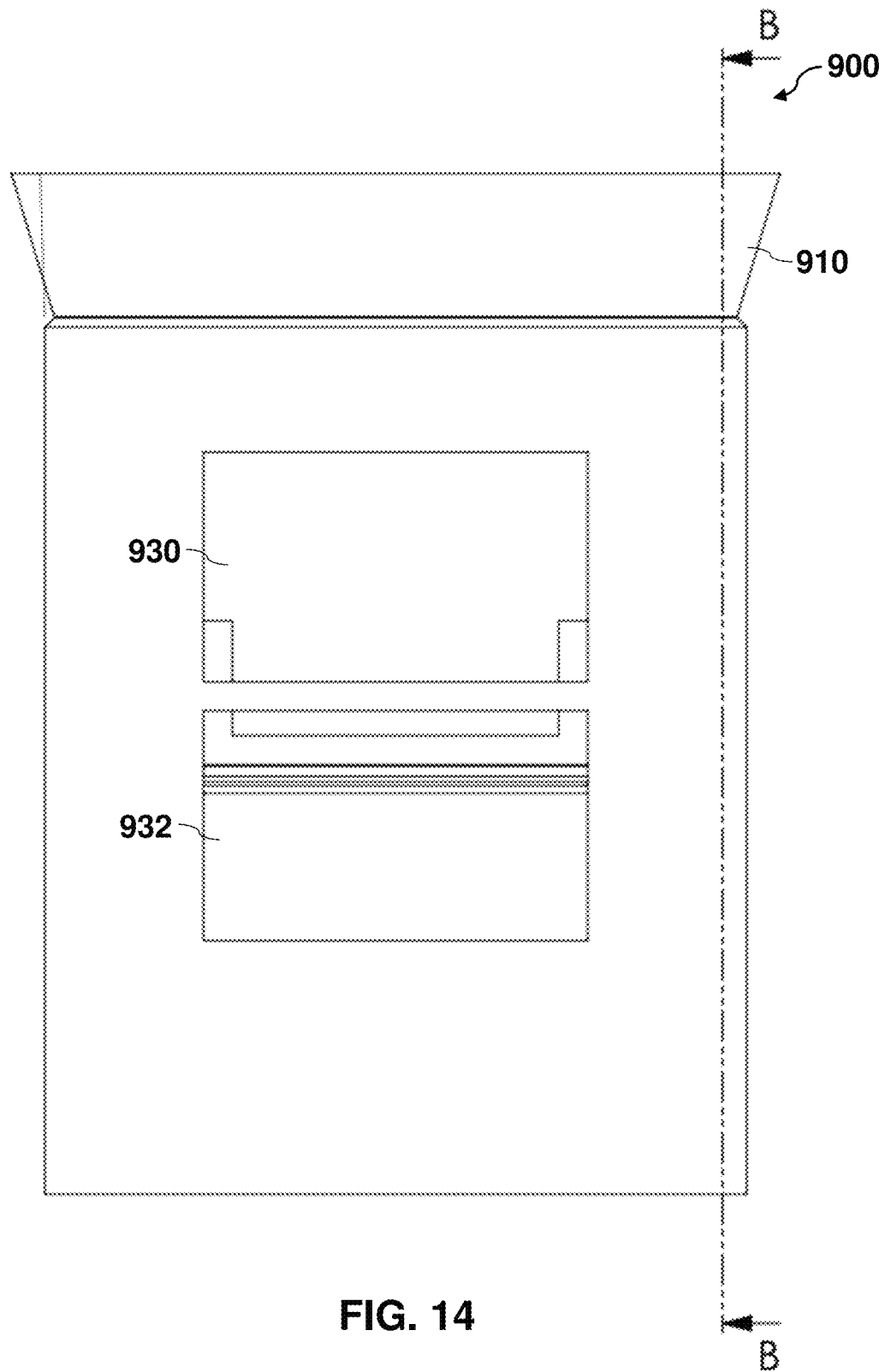
FIG. 14 is a front view of a landing station with a pivoting rear door for securing and protecting package lockers in the stowed position.

FIG. 14 is the front view of a drone landing station with pivoting rear doors 900. In some embodiments, the landing station includes a centering mechanism 910, onto which the drone lands. In some embodiments, the centering mechanism can include, among other things, magnetic centering and dovetail doors. Two package lockers, 930 and 932 are shown in FIG. 14. In some embodiments, these store packages delivered by drones. In some embodiments, these are managed by centering mechanism 910 and internal robotic equipment. In some embodiments, a user, upon receiving a legitimate package from locker 930, can attempt to reach through open locker 930, and grasp the back of a package in locker 932. In some embodiments, it is possible to manipulate that package past the robotic equipment inside the landing station and withdraw it through locker opening 930 without proper authorization, thus compromising the security of packages stored in locker 932. In some embodiments, drone landing station 900 prevents, or at least reduces, access through the front opening of package locker 930 to equipment internal to drone landing station with pivoting rear doors 900, or the contents of other package lockers (for example package locker 932).

Figure 15:
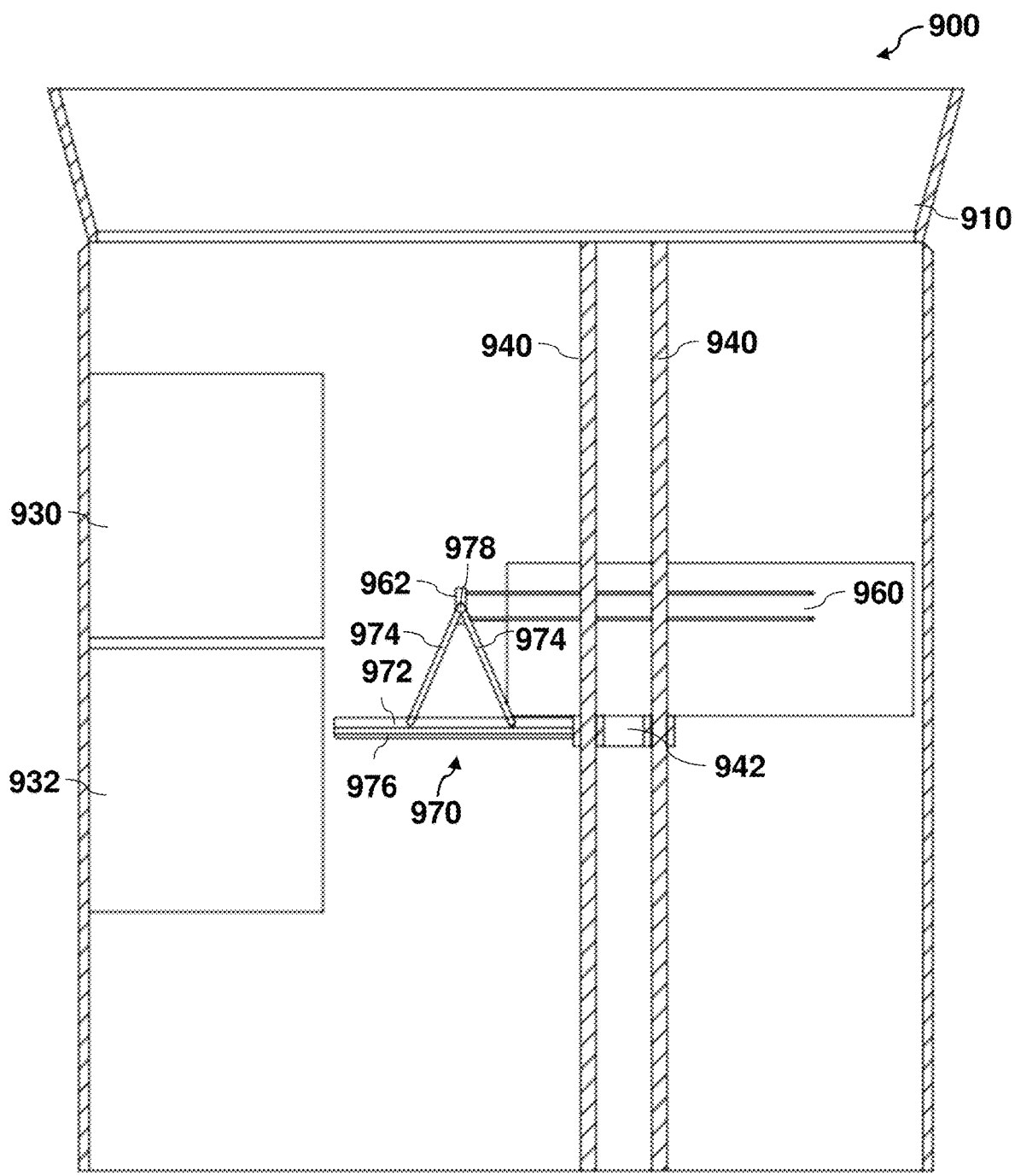
FIG. 15 is a cross-sectional side view of the landing station of FIG. 14 taken in the direction of arrows B-B with pivoting rear door in the stowed position.

FIG. 15 is the view through section B-B on FIG. 14 when the pivoting rear door is in the stowed position. In some embodiments, robotic package handling equipment moves packages from centering mechanism 910 and into one of the package lockers such as package locker 930 and/or package locker 932. In some embodiments, this is done under computer control.

In some embodiments, the package handling mechanism comprises, among other things, elevator guides and actuators 940 that move elevator platform 942 to one of several levels within drone landing station with pivoting rear doors 900. In some embodiments, Y-Axis guides and actuator 960 move gripper platform 962 to insert and/or remove package(s) from one or more of the package lockers such as package locker 930 and/or package locker 932. In some embodiments, elevator guides and actuators 940 and/or Y-Axis guides and actuator 960 can be of various types, including, but not limited to, belt, chain, leadscrew, rack and pinion, linear motor, hydraulic or pneumatic, under computer control.

FIG. 15 illustrates pivoting rear door assembly 970 shown in its stowed position. In some embodiments, pivoting rear door assembly 970 comprises solid rear door 972, struts 974, weatherstrip seal 976 and/or rotary actuator 978. In some embodiments, rotary actuator 978 can include, but not limited to, a direct motor drive, harmonic drive, spur gear drive, worm gear drive, hydraulic or pneumatic, under computer control. In some embodiments, when pivoting rear door assembly 970 is moved by rotary actuator 978, its motion path is arranged so it does not collide with parts of the robotic package handling mechanism. In some embodiments, while in the stowed position, rear door assembly 970 does not interfere with the operation of the robotic package handling mechanism, and the rear of package lockers 930 and 932 remain unobstructed for it to perform free insertion or removal of packages from behind.

Figure 16:
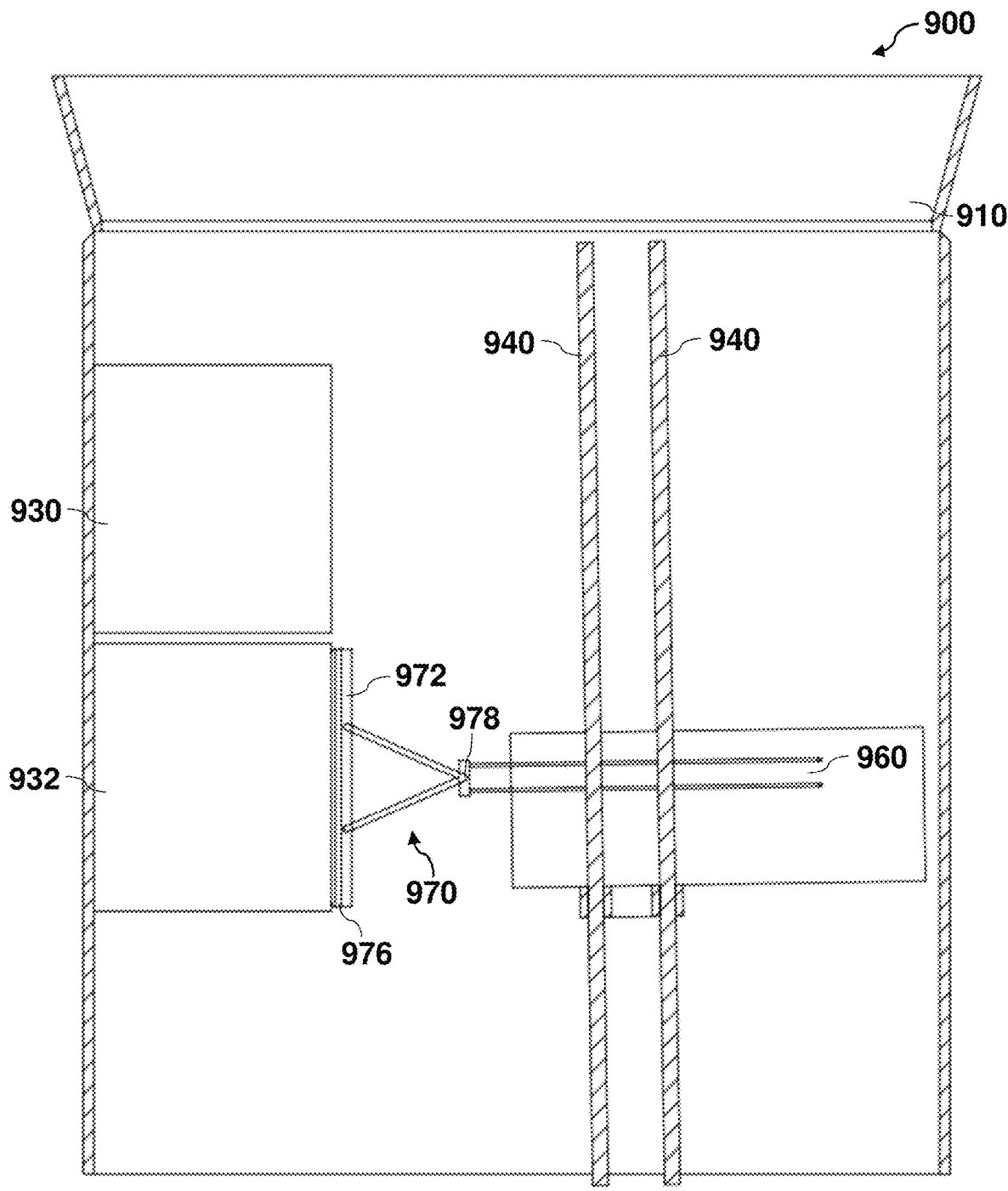
FIG. 16 is a cross-sectional side view of the landing station of FIG. 14 taken in the direction of arrows B-B with pivoting rear door in a deployed position.

FIG. 16 is a view through cross section B-B shows pivoting rear door assembly 970 in its deployed position. In some embodiments, when a user of landing station with pivoting rear doors 900 is about to retrieve or insert a package (e.g., from locker 932 in this example), the robotic package handling equipment aligns the pivoting rear door assembly 970 such that it completely, or at least mostly, seals the back of package locker 932. In some embodiments, this alignment involves a control computer commanding the elevator guides and actuators 940, Y-Axis guides and actuator 960 and/or rotary actuator 978 into pre-programmed positions for each package locker, such as package locker 930 and package locker 932. In some embodiments, this aligns solid rear door 972 to completely, or at least mostly, cover the back opening of package locker 932, pressing weatherstrip seal 976 tightly against its back frame. In some embodiments, at this point, the selected package locker can be opened, and the user can retrieve a package from the locker. In some embodiments, because the rear of package locker is completely, or at least mostly, covered by solid rear door 972, and weatherstrip seal 976, the likelihood dropping of packages or passage of moisture or contaminants into the interior of landing station with pivoting rear door 900 is effectively prevented or at least reduced. In some embodiments, solid rear door 972 prevents, or at least reduces the possibility of a user reaching through open package locker 932 and attempting to steal packages stored in adjacent package locker 930 from behind.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A parcel-receiving device comprising:
   a landing station guidance-and-security system comprising:
      an at least one environmental cover;
      a first guide-and-security bar;
      a second guide-and-security bar;
      a third guide-and-security bar; and
      a fourth guide-and-security bar,
   wherein said first guide-and-security bar and said second guide-and-security bar are on a first plane, and wherein said third guide-and-security bar and said fourth guide-and-security bar are on a second plane;
   wherein said first guide-and-security bar and said second guide-and-security bar run perpendicular to said third guide-and-security bar and said fourth guide-and-security bar; and
   wherein said first guide-and-security bar comprises a first direct contact lead and a second direct contact lead, wherein said first direct contact lead and said second direct contact lead are configured to charge a drone via contact patches located on said drone.

2. The parcel-receiving device of claim 1 wherein said landing station guidance-and-security system further comprises:
   a housing wherein said at least one environmental cover can be retracted into said housing.

3. The parcel-receiving device of claim 1 wherein said at least one environmental cover is configured to create a slope when in a closed position.

4. The parcel-receiving device of claim 1 wherein said at least one environmental cover is made of segmented metal.

5. The parcel-receiving device of claim 1 wherein said landing station guidance-and-security system further comprises:
   a gutter.

6. The parcel-receiving device of claim 5 wherein said gutter includes a downspout.

7. The parcel-receiving device of claim 1 wherein said first guide-and-security bar comprises an at least one precision rod.

8. The parcel-receiving device of claim 7 wherein said at least one precision rod comprises a magnet.

9. The parcel-receiving device of claim 8 wherein said magnet is an electromagnet.

10. The parcel-receiving device of claim 8 wherein said magnet is a permanent magnet.

11. The parcel-receiving device of claim 1 wherein said landing station guidance-and-security system further comprises:
   an at least one guide track.

12. The parcel-receiving device of claim 1 wherein said first guide-and-security bar is made of metal.

13. The parcel-receiving device of claim 1 further comprising a plow bar.

14. The parcel-receiving device of claim 1 wherein said at least one environmental cover is programmed to open and close based on expected precipitation.

15. The parcel-receiving device of claim 1 wherein said landing station guidance-and-security system further comprises a second environmental cover.

16. The parcel-receiving device of claim 15 wherein said at least one environmental cover is configured to form a seal with said second environmental cover aided by a first magnet located in an end of said at least one environmental cover and a second magnet located in an end of said second environmental cover.

17. The parcel-receiving device of claim 1 wherein a first magnet located on said landing station guidance-and-security system interacts with a second magnet located on said drone to help provide contact between said first direct contact lead, said second direct contact lead, and said contact patches.

18. The parcel-receiving device of claim 1 wherein said first direct contact lead has a first polarity and said second direct contact has a second polarity.

19. The parcel-receiving device of claim 1 wherein said landing station guidance-and-security system can enter a secured state wherein at least one of said first guide-and-security bar, said second guide-and-security bar, said third guide-and-security bar, and said fourth guide-and-security bar is electrified.

\* \* \* \* \*